United States Patent
Baek et al.

(10) Patent No.: US 12,149,376 B2
(45) Date of Patent: Nov. 19, 2024

(54) METHOD FOR SHARING INSTRUCTIONS FOR IoT APPARATUSES, AND ELECTRONIC DEVICE

(71) Applicant: SAMSUNG ELECTRONICS CO., LTD., Suwon-si (KR)

(72) Inventors: Joonhye Baek, Suwon-si (KR); Gulji Chung, Suwon-si (KR); Para Kang, Suwon-si (KR); Changwon Kim, Suwon-si (KR); Joohee Park, Suwon-si (KR); Youngchan Woo, Suwon-si (KR); Joohee Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/958,967

(22) Filed: Oct. 3, 2022

(65) Prior Publication Data
US 2023/0029383 A1 Jan. 26, 2023

Related U.S. Application Data

(63) Continuation of application No. PCT/KR2021/000745, filed on Jan. 19, 2021.

(30) Foreign Application Priority Data

Apr. 3, 2020 (KR) .......... 10-2020-0041197

(51) Int. Cl.
*H04L 12/28* (2006.01)
*H04L 41/08* (2022.01)

(52) U.S. Cl.
CPC ........ *H04L 12/282* (2013.01); *H04L 12/2825* (2013.01); *H04L 41/0879* (2013.01); *H04L 2012/2841* (2013.01)

(58) Field of Classification Search
CPC .............. H04L 12/282; H04L 12/2825; H04L 41/0879; H04L 2012/2841; H04L 65/1069;
(Continued)

(56) References Cited

U.S. PATENT DOCUMENTS 9,930,519 B2   3/2018   Kim et al.
11,223,936 B2   1/2022   Park et al.
(Continued)

FOREIGN PATENT DOCUMENTS

JP       2015-129696 A    7/2015
KR   10-2015-0028191 A    3/2015
(Continued)

OTHER PUBLICATIONS

International Search Report dated Apr. 20, 2021 issued by the International Searching Authority in counterpart International Application No. PCT/KR2021/000745 (PCT/ISA/210).
(Continued)

*Primary Examiner* — David R Lazaro
*Assistant Examiner* — Zia Khurshid
(74) *Attorney, Agent, or Firm* — Sughrue Mion, PLLC

(57) ABSTRACT

An electronic device may include: a communication module; a processor operatively connected to the communication module; and a memory operatively connected to the processor and configured to store computer program code. The computer program code, when executed, enables the processor to: upon detection of execution of a first operation of a first Internet of Things (IoT) device, obtain, from the memory, a first instruction to operate the first IoT device in a second operation; transmit the first instruction to the first IoT device to operate the first IoT device in the second operation; and monitor execution of the second operation by the first IoT device.

18 Claims, 18 Drawing Sheets

(58) Field of Classification Search
CPC ..... H04L 65/1073; H04L 67/34; H04L 67/12; H04L 67/51; G16Y 40/00
See application file for complete search history.

(56) References Cited

U.S. PATENT DOCUMENTS

| | | | |
|---|---|---|---|
| 2014/0244833 A1* | 8/2014 | Sharma | H04L 12/281 709/224 |
| 2015/0066158 A1 | 3/2015 | Kim et al. | |
| 2016/0041534 A1* | 2/2016 | Gupta | H04W 4/70 700/275 |
| 2017/0325047 A1 | 11/2017 | Park et al. | |
| 2018/0146045 A1 | 5/2018 | Kang | |
| 2019/0026710 A1* | 1/2019 | Chow | H04L 67/567 |
| 2021/0194717 A1 | 6/2021 | Yoon et al. | |

FOREIGN PATENT DOCUMENTS

| | | |
|---|---|---|
| KR | 10-2015-0121091 A | 10/2015 |
| KR | 10-2017-0041743 A | 4/2017 |
| KR | 10-2017-0085479 A | 7/2017 |
| KR | 10-2017-0129551 A | 11/2017 |
| KR | 10-2018-0024194 A | 3/2018 |
| KR | 10-2019-0004896 A | 1/2019 |
| KR | 10-2019-0084168 A | 7/2019 |
| WO | 2016/080558 A1 | 5/2016 |
| WO | 2016/190557 A1 | 12/2016 |

OTHER PUBLICATIONS

International Written Opinion dated Apr. 20, 2021 issued by the International Searching Authority in counterpart International Application No. PCT/KR2021/000745 (PCT/ISA/237).

* cited by examiner

[Basic usage guide instruction generation condition and result]

| Registration of IoT device held by user | Registration of IoT device held by user Reception of state change information on registered IoT device |
|---|---|
| - Identify linkable IoT devices for each household activity and group IoT devices Ex) Washing IoT devices: Washing machine, dryer, air dresser, shoe care device, etc.<br>- Identify different user having same IoT device as that of user via communication with service server | - Change of power state (On/Off/standby mode) of IoT device<br>- Change in sensor related to IoT device Ex) Recognition of pollution by air purifier<br>- Change of input data of registered IoT device Ex) Clothing data of air dresser |
| Structural result value of IoT device group of usage guide instruction is affected | Result value at time point to recommend usage guide instruction is affected |
| - Structurize usage guide instruction in which multiple linked IoT devices for each household activity are grouped by one activity<br>- Preferentially recommend instruction used many times by different user having same IoT device | - Recommend related usage guide instruction through determination of which household activity is to be started<br>- Propose necessity for household activity through data of IoT device first |

[Elaboration of condition usage guide instruction over time]

| After execution of usage guide instruction |
|---|
| - Modify instruction after execution therof<br>- Re-execute stored instruction<br>- Modify stored instruction<br>- Share stored instruction with service server |
| Change of detailed configuration value of usage guide instruction is affected |
| - Usage guide instruction is modified to meet user's situation or taste<br>- As data on execution of usage guide instruction is accumulated, instruction configuration value becomes elaborate to correspond to data. |

FIG.6

| 210 | 220 | 230 | 240 | 250 | 260 | 270 |
|---|---|---|---|---|---|---|
| Air Care | Fabric Care | Food Care | Cooking Care | Cleaning Care | Body Care | Entertainment |
| · Air conditioner<br>· Air purifier<br>· Humidifier<br>· Dehumidifier<br>... | · Washing machine<br>· Dryer<br>· Clothing purifier<br>· Shoe care device<br>... | · Refrigerator<br>· Kimchi refrigerator<br>· Wine refrigerator<br>· Hot/cold storage device<br>... | · Oven<br>· Induction stove/ cooktop<br>· Electric Range<br>· Microwave<br>· Hood<br>... | · Dry robot cleaner<br>· Wet robot cleaner<br>· Stick cleaner<br>· Dish washer<br>... | · LED mask<br>· Walking aid<br>· Smart mirror<br>· Exercise IoT device<br>... | · Display such as TV<br>· Smart speaker<br>· Sound IoT device |

FIG.9

| Type of IoT devices linked between different product groups | Type of IoT devices linked in same product group | Type of IoT devices linked between different product groups |
|---|---|---|
| · Parallel type<br>- Robot cleaner → Air purifier<br>  (Management of air quality after cleaning)<br>- Induction stove → Dishwasher<br>  (Cleaning after cooking)<br>- Oven → Hot/cold storage device<br>  (Management of food temperature after cooking)<br><br>· Sequential type<br>- Clothing purifier + Dehumidifier<br>  (Dehumidification of<br>  dressing room during purification of clothing)<br>- LED mask + Smart speaker<br>- (Listening to audio book during sking care) | · Parallel type<br>- Induction stove + Hood<br>- Air conditioner + Air purifier<br>- Clothing purifier + Shoe care device<br>- TV + Sound Iot device<br><br>· Sequential type<br>- Washing machine → Dryer<br>- Dry robot cleaner → Wet robot cleaner<br>- Induction stove → Oven | · Cooking Care -> Air Care<br>  (Management of air quality after cooking)<br>  : (Induction stove + Hood)<br>  → (Air conditioner + Air purifier)<br><br>· Cleaning Care -> Air Care<br>  (Management of air quality after cleaning)<br>  : (Dry robot cleaner → Wet robot cleaner)<br>  → (Air purifier)<br>· Body Care + Air Care<br>  (Management of temperature in home during exercise)<br>  : (Smart mirror + Exercise IoT device)<br>  + Air conditioner |

METHOD FOR SHARING INSTRUCTIONS FOR IoT APPARATUSES, AND ELECTRONIC DEVICE

CROSS-REFERENCE TO RELATED APPLICATIONS

This application is a bypass continuation application of International Application No. PCT/KR2021/000745, filed Jan. 19, 2021, which claims priority to Korean Patent Application No. 10-2020-0041197, filed on Apr. 3, 2020, in the Korean Intellectual Property Office, the disclosures of which are incorporated by reference herein in their entireties.

BACKGROUND

1. Field

The disclosure relates to a method and an electronic device for sharing an instruction for operation of Internet of things (IoT) devices held by users.

2. Description of Related Art

Various IoT devices (e.g., home appliances) have been used according to the development of Internet of things (IoT) technology. Recently, there is a rising interest in a smart home service using IoT devices. The smart home service is a technology of networking and controlling IoT devices in a home, and is being grafted on IoT technology. IoT technology is a core technology of the fourth industrial revolution, and enables connection between IoT devices in a home by network, and control of operations of the IoT devices.

A control menu is programmed in each of various IoT devices located in a home, but it is generally not possible to operate the IoT devices without the control menu programmed in each IoT device. Furthermore, since various IoT devices located in a home are individually operated, IoT devices belonging to the same product group are unable to be operated in connection with each other. IoT devices belonging to different product groups are also unable to be operated in connection with each other. Therefore, there is a problem in that users holding identical or similar IoT devices cannot share an instruction to operate the IoT devices.

SUMMARY

It is a technical aspect of various embodiments of the disclosure to provide a method for sharing an instruction to control a function of IoT devices, the instruction enabling control of multiple IoT devices located in a home or a particular pace in conjunction with each other, and an electronic device capable of performing the method.

It is another technical aspect of various embodiments of the disclosure to provide a method for sharing an instruction to control a function of an IoT device between different users holding identical or similar IoT devices, and an electronic device capable of performing the method.

An electronic device according to various embodiments of the disclosure may include a communication module, a processor operatively connected to the communication module, and a memory operatively connected to the processor and configured to store computer program code. When executed, the computer program code may cause the processor to, based on detecting execution of a first operation by a first Internet of Things (IoT) device: obtain, from the memory, a first instruction to operate the first IoT device in a second operation, transmit the first instruction to the first IoT device to operate the first IoT device in the second operation, and monitor execution of the second operation by the first IoT device.

The computer program code may further cause the processor to identify a second IoT device operable in connection with the first IoT device through the first instruction, and transmit the first instruction to the second IoT device to thereby sequentially operate the second IoT device after the operating of the first IoT device.

The computer program code may further cause the processor to identify a second IoT device operable in connection with the first IoT device through the first instruction, and transmit the first instruction to the second IoT device to thereby simultaneously operate the first IoT device and the second IoT device.

The computer program code may further cause the processor to obtain detection information from the first IoT device, and based on the execution of the second operation by the first IoT device according to the first instruction not being suitable based on the detection information, modify the first instruction, based on the detection information and transmit the modified first instruction to the first IoT device to operate the first IoT device in the second operation.

The computer program code may further cause the processor to identify a request from a user to modify the first instruction, modify the first instruction before transmitting, based on the request, and operate the first IoT device in the second operation according to the modified first instruction.

The computer program code may further cause the processor to modify, based on a selection of the user, at least one configuration element included in the first instruction. The configuration element may be one of: operation modes of the first IoT device, a total operation time, an operation order of the operation modes, and an operation time for each operation mode.

The computer program code may further cause the processor to store the modified first instruction in the memory, and transmit the modified first instruction to a service server connected via a communication network.

The computer program code may further cause the processor, after the execution of the second operation of the first IoT device according to the first instruction is terminated, to modify the first instruction based on a request from a user, and transmit the modified first instruction to a service server connected via a communication network.

The computer program code may further cause the processor to classify instructions executed by users, and manage the classified instructions so as to enable selection of each classified instruction for execution.

The computer program code may further cause the processor, based on the first instruction grouping a plurality of IoT devices for operation in connection with each other, to transmit the first instruction to each of the plurality of IoT devices to thereby sequentially or simultaneously operate the plurality of IoT devices.

The computer program code may further cause the processor to register the electronic device in a service server connected via a communication network, by using an identification (ID), connect to the first IoT device via the service server, transmit the first instruction to the first IoT device via the service server so as to operate the first IoT device, and monitor the execution of the second operation via the service server.

The computer program code may further cause the processor, based on detecting execution of a third operation by a second IoT device, to receive a second instruction, from a service server connected via a communication network, to operate the second IoT device in a fourth operation, and transmit the second instruction to the second IoT device to operate the second IoT device in the fourth operation.

The computer program code may further cause the processor to monitor execution of the fourth operation by the second IoT device responsive to the second instruction, via the service server.

The computer program code may further cause the processor to identify a request from a user to modify the second instruction, modify, based on the request, at least one configuration element included in the second instruction, the configuration element being one of: operation modes of the second IoT device, a total operation time, an operation order of the operation modes, and an operation time for each operation mode, and transmit the modified second instruction to the second IoT device to operate the second IoT device.

The computer program code may further cause the processor to transmit the modified second instruction to the service server.

A method for sharing an instruction between IoT devices according to various embodiments of the disclosure may include detecting, by an electronic device, execution of a first operation by a first Internet of Things (IoT) device, based on detecting the execution of the first operation by the first IoT device, obtaining, from a memory of the electronic device, a first instruction to operate the first IoT device in a second operation, and transmitting the first instruction to the first IoT device to operate the first IoT device in the second operation.

A non-transitory computer-readable recording medium may have recorded thereon instructions executable by at least one processor to perform a method for sharing an instruction between IoT devices. The method may include detecting, by an electronic device, execution of a first operation by a first Internet of Things (IoT) device, based on detecting the execution of the first operation by the first IoT device, obtaining, from a memory of the electronic device, a first instruction to operate the first IoT device in a second operation, and transmitting the first instruction to the first IoT device to operate the first IoT device in the second operation.

Various embodiments of the disclosure may provide a method for sharing an instruction to control a function of IoT devices, the instruction enabling control of multiple IoT devices located in a home or a particular pace in conjunction with each other, and an electronic device capable of performing the method.

Various embodiments of the disclosure may provide a method for sharing an instruction to control a function of an IoT device between different users holding identical or similar IoT devices, and an electronic device capable of performing the method.

Various other advantageous effects identified explicitly or implicitly through the disclosure may be provided.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 illustrates an example set of instruction generation conditions and result values, according to various embodiments;

FIG. 9 illustrates a classification of IoT devices by product groups, according to various embodiments;

FIG. 10 illustrates an example linking of IoT devices and their respective functions for operation in connection with each other, according to various embodiments;

In relation to the description of drawings, the same or similar elements may be indicated by the same or similar reference signs.

DETAILED DESCRIPTION

Figure 1:
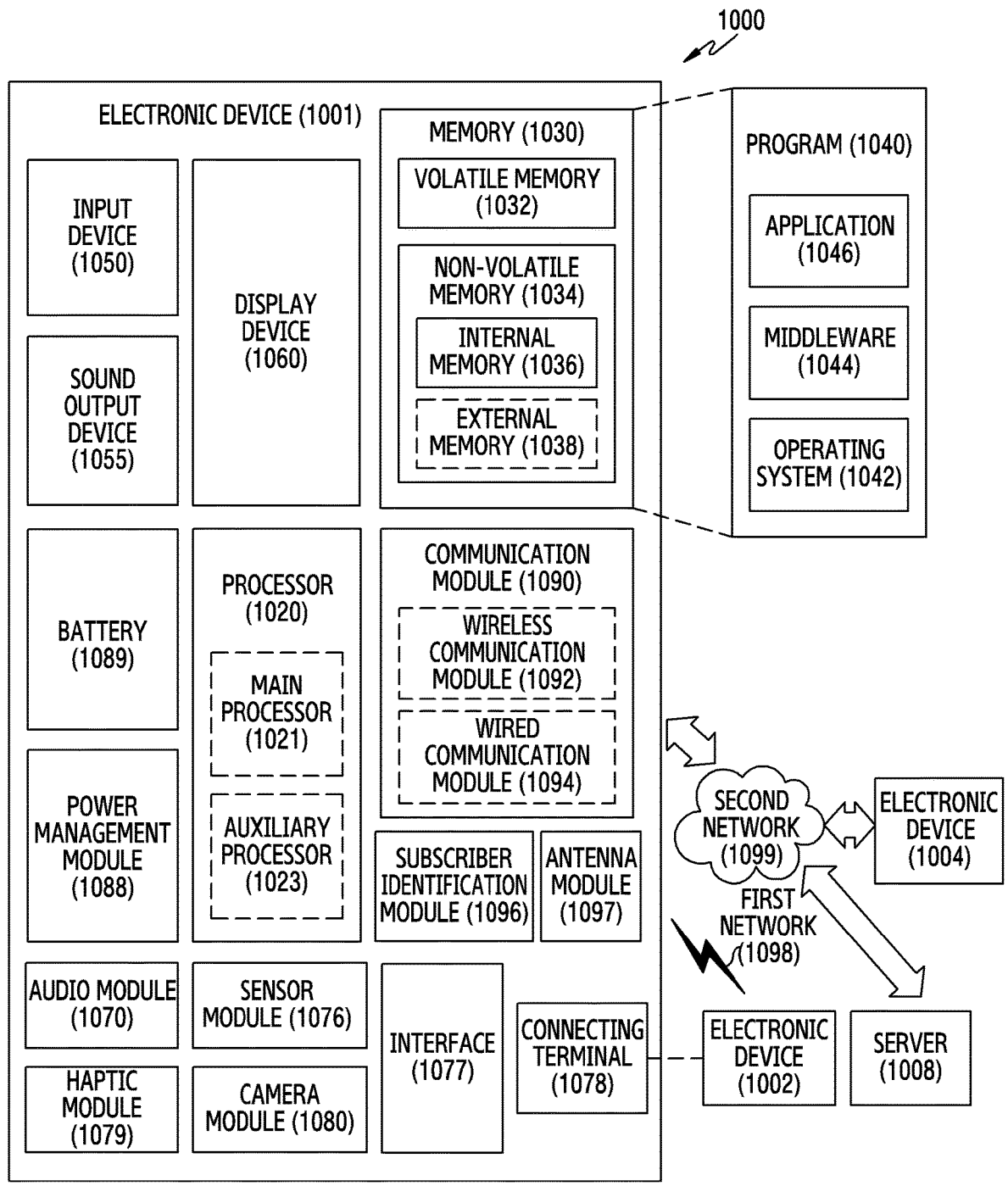
FIG. 1 is a block diagram illustrating an electronic device in a network environment, according to various embodiments.

Hereinafter, various embodiments of the present disclosure will be described with reference to the accompanying drawings. For description's convenience sake, the sizes of the components shown in the drawings may be exaggerated or reduced, and the present disclosure is not necessarily limited to the illustrated.

FIG. 1 is a block diagram illustrating an electronic device 1001 in a network environment 1000 according to various embodiments.

Referring to FIG. 1, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 1001. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thererto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, a keyboard, or a digital pen (e.g., a stylus pen).

The sound output device 1055 may output sound signals to the outside of the electronic device 1001. The sound output device 1055 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain the sound via the input device 1050, or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., PCB). According to an embodiment, the antenna module 1097 may include a plurality of antennas. In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. According to an embodiment, all or some of operations to be executed at the electronic device 1001 may be executed at one or more of the external electronic devices 1002 or 1004, or the server 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

Figure 2:
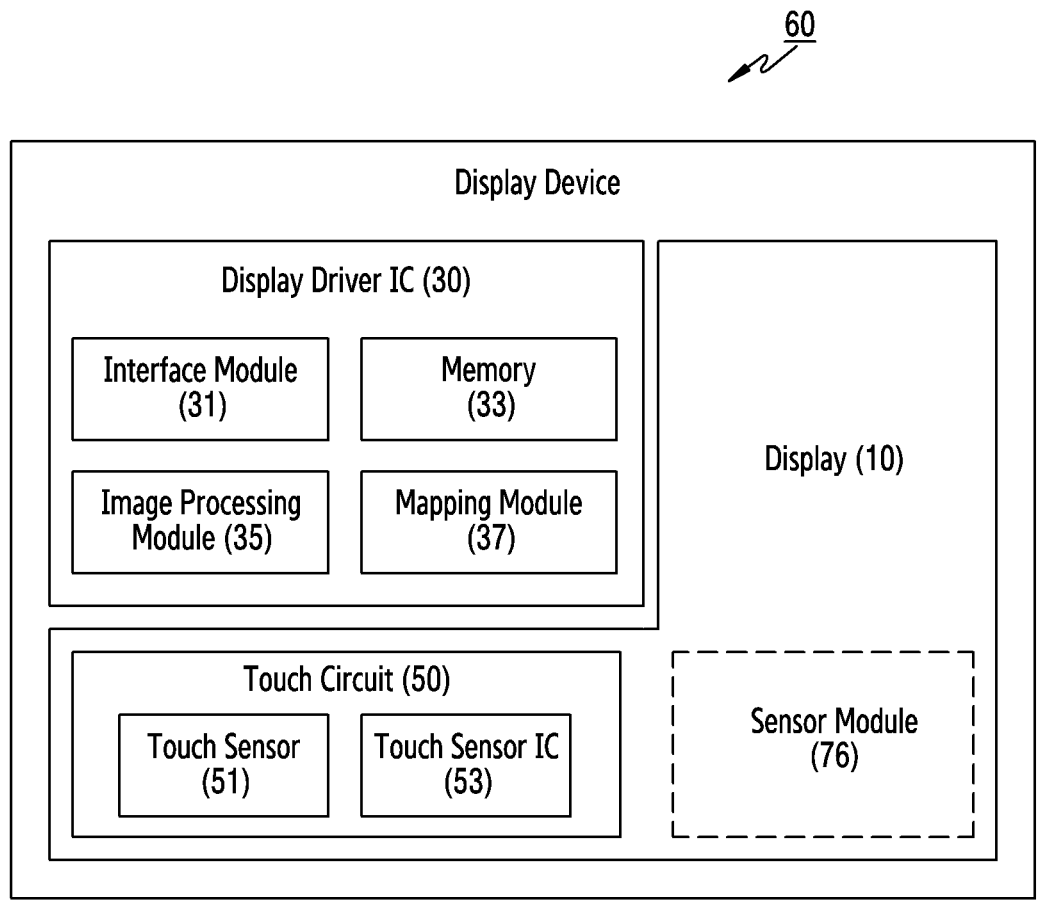
FIG. 2 is a block diagram illustrating a display device, according to various embodiments.

FIG. 2 is a block diagram illustrating a display device 60 according to various embodiments.

Referring to FIG. 2, the display device 60 (e.g., the display device 1060 in FIG. 1) may include a display 10 and a display driver IC (DDI) 30 for controlling the display. The DDI 30 may include an interface module 31, a memory 33 (e.g., buffer memory), an image processing module 35, or a mapping module 37. The DDI 30 may receive, for example, image data or image information including an image control signal corresponding to a command for controlling the image data, from a different element of an electronic device (e.g., the electronic device 1010 in FIG. 1) via an interface module 31. For example, according to an embodiment, image information may be received from a processor (the processor 1020 in FIG. 1) (e.g., the main processor 1021 (e.g., an application processor) or the auxiliary processor 1023 (e.g., a graphic processing device) operated independently to a function of the main processor 1021). The DDI 30 may communicate with a touch circuit 50 or a sensor module 76 via the interface module 31. In addition, the DDI 30 may store at least a part of the received image information in a memory 33, for example, in a unit of frames. An image processing module 35 may, for example, pre-process or post-process (e.g., resolution, brightness, or size adjustment) at least a part of the image data, at least based on a characteristic of the image data or a characteristic of the display 10. A mapping module 37 may generate a voltage value or a current value corresponding to the image data pre-processed or post-processed by the image processing module 35. According to an embodiment, generation of a voltage value or a current value may be performed, for example, at least partially based on an attribute (e.g., array of pixels (RGB stripe or PenTile structure), or size of each of sub-pixels) of pixels of the display 10. At least a part of pixels of the display 10 may be operated, for example, at least partially based on the voltage value or the current value to allow visual information (e.g., text, image, or icon) corresponding to the image data to be displayed through the display 10.

According to an embodiment, the display device 60 may further include the touch circuit 50. The touch circuit 50 may include a touch sensor 51 and a touch sensor IC 53 for controlling the touch sensor. The touch sensor IC 53 may, for example, control the touch sensor 51 to detect a touch input or a hovering input on a particular position of the display 10. For example, the touch sensor IC 53 may detect a touch input or hovering input by measuring a change in a signal (e.g., voltage, quantity of light, resistance, or quantity of electric charge) on a particular position of the display 10. The touch sensor IC 53 may provide information (e.g., position, area, pressure, or time) relating to a detected touch input or hovering input to a processor (e.g., the processor 1020 in FIG. 1). According to an embodiment, at least a part (e.g., touch sensor IC 53) of the touch circuit 50 may be included as a part of the display driver IC 30 or display 10, or a part of a different element (e.g., the auxiliary processor 1023 in FIG. 1) disposed outside the display device 60.

According to an embodiment, the display device 60 may further include at least one sensor (e.g., fingerprint sensor, iris sensor, pressure sensor, or illuminance sensor) of the sensor module 76 or a control circuit for the sensor. In this case, the at least one sensor or the control circuit therefor may be embedded in a part (e.g., the display 10 or the DDI 30) of the display device 60 or a part of the touch circuit 50. For example, when the sensor module 76 embedded in the display device 60 includes a biosensor (e.g., fingerprint sensor), the biosensor may obtain biological information (e.g., a fingerprint image) associated with a touch input through a partial area of the display 10. As another example, when the sensor module 76 embedded in the display device 60 includes a pressure sensor, the pressure sensor may obtain pressure information associated with a touch input through a partial area or the entire area of the display 10. According to an embodiment, the touch sensor 51 or the sensor module 76 may be disposed between pixels of a pixel layer of the display 10, or on or under the pixel layer.

Figure 3:
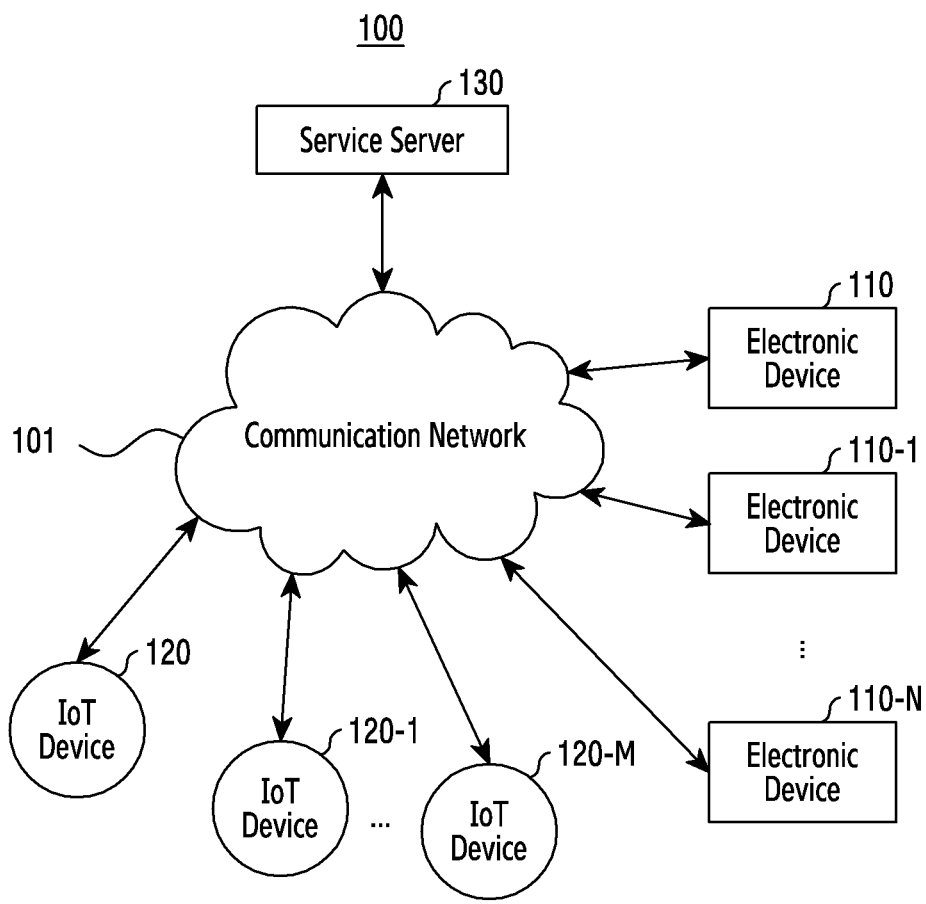
FIG. 3 illustrates a smart IoT service system, according to various embodiments.

FIG. 3 illustrates a smart IoT service system 100 according to various embodiments.

Referring to FIG. 3, the smart IoT service system 100 may include multiple electronic devices 110, 110-1, . . . , and 110-N (e.g., the electronic devices 1001, 1002, and 1004 in FIG. 1), multiple IoT devices 120, 120-1, . . . , and 120-M, and a service server 130 (e.g., the server 1008 in FIG. 1). The multiple electronic devices 110, 110-1, . . . , and 110-N, the multiple IoT devices 120, 120-1, . . . , and 120-M, and the service server 130 may be connected via a communication network 101.

As an embodiment, the multiple electronic devices 110, 110-1, . . . , and 110-N may be connected to the communication network 101. The multiple IoT devices 120, 120-1, . . . , and 120-M may be connected to the communication network 101. The service server 130 may be connected to the communication network 101.

As an embodiment, the multiple IoT devices 120, 120-1, . . . , and 120-M may be connected to the service server 130 via the communication network 101. In addition, the multiple IoT devices 120, 120-1, . . . , and 120-M may be connected to the multiple electronic devices 110, 110-1, . . . , and 110-N via the communication network 101.

As an embodiment, the multiple electronic devices 110, 110-1, . . . , and 110-N and the multiple IoT devices 120, 120-1, . . . , and 120-M may be connected to each other via the communication network 101.

As an embodiment, the service server 130 may be connected to the multiple electronic devices 110, 110-1, . . . , and 110-N via the communication network 101. The service server 130 may be connected to the multiple IoT devices 120, 120-1, . . . , and 120-M via the communication network 101. The service server 130 may store and manage data from the multiple electronic devices 110, 110-1, . . . , and 110-N. The service server 130 may transmit data to the multiple electronic devices 110, 110-1, . . . , and 110-N. The service server 130 may store and manage data from the multiple IoT devices 120, 120-1, . . . , and 120-M. The service server 130 may transmit data to the multiple IoT devices 120, 120-1, . . . , and 120-M.

As an embodiment, one or more electronic devices (e.g., the electronic device 110) and one or more IoT devices (e.g., the IoT device 120) positioned in a particular space (e.g., home, office, company, factory, and public space) may be connected to each other via the communication network 101.

As an embodiment, one or more electronic devices (e.g., the electronic device 110) positioned in a particular space (e.g., home, office, company, factory, and public space) may be registered in the service server 130 so as to use an instruction to operate one or more IoT devices (e.g., the IoT device 120). One or more IoT devices (e.g., the IoT device 120) positioned in a particular space (e.g., home, office, company, factory, and public space) may be registered in the service server 130 so as to be operated by an instruction received from one or more electronic devices (e.g., the electronic device 110). The one or more electronic devices (e.g., the electronic device 110) and the one or more IoT devices (e.g., the IoT device 120) may use the same identification (ID) to be registered in the service server 130. The disclosure is not limited thereto, and the one or more electronic devices (e.g., the electronic device 110) and the one or more IoT devices (e.g., the IoT device 120) may use different IDs to be registered in the service server 130.

As an embodiment, the one or more electronic devices 110 positioned in a particular space (e.g., home) may store and manage an instruction to control an operation of the one or more IoT devices 120 The one or more IoT devices 120 positioned in a particular space (e.g., home) may be operated by an instruction from the one or more electronic devices 110.

The service server 130 may mean a functional and structural combination of software and hardware for storing information. In addition, the service server 130 may include all data storage media and data structures capable of storing information corresponding to a database (DB). A separate database management system (DBMS) for searching for, storing, and managing information stored in the service server 130 may be included.

In the disclosure, the multiple electronic devices 110, 110-1, . . . , and 110-N may include a smartphone, a mobile phone, a wearable device (e.g., a smart watch, a wired/ wireless headset, and a wired/wireless earset), a tablet computer, a laptop computer, a desktop, a computer, a work station, and a smart speaker.

In the disclosure, the multiple IoT devices 120, 120-1, . . . , and 120-M may indicate a home appliance in a home. As an embodiment, the multiple IoT devices 120, 120-1, . . . , and 120-M may include an air conditioner, an air purifier, a humidifier, a dehumidifier, a washing machine, a dryer, a clothing purifier, a shoe care device, a door lock, a surveillance camera, a refrigerator, a kimchi refrigerator, a wine refrigerator, a hot/cold storage device, an oven, an induction stove/cooktop, an electric range, a microwave, a hood, a dry robot cleaner, a wet robot cleaner, a stick cleaner, a dishwasher, an LED mask, a walking aid, a smart mirror, an exercise device, a display device (e.g., TV or monitor), a smart speaker, a sound device, a home appliance, furniture, fitness equipment, crime prevention equipment, a sensor, a meter, a robot, office equipment, medical equipment, production equipment, and a means of transport. As an embodiment, the multiple IoT devices 120, 120-1, . . . , and 120-M may include an electronic device used in an automation system for a home or a building, an automation system for various industries, such as office work, agriculture, manufacturing, distribution, sales, transportation, finance, an energy or environment system, and a smart city.

Figure 4:
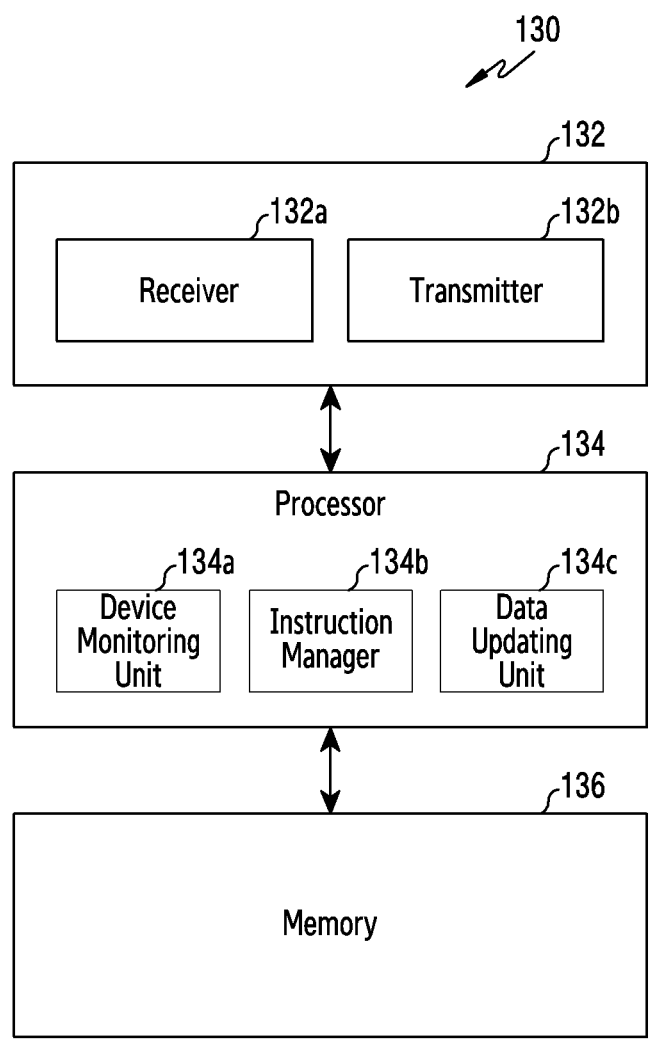
FIG. 4 illustrates details of a service server illustrated in FIG. 3, according to various embodiments.

FIG. 4 illustrates details of the service server 130 illustrated in FIG. 3 according to various embodiments.

Referring to FIG. 3 and FIG. 4, the service server 130 may include a communication circuit or other communication unit 132, a processor 134, and a memory 136. The communication unit 132 may include a receiver 132*a* and a transmitter 132*b*. The receiver 132*a* may be connected to the communication network 101 so as to receive a wired/wireless signal from the IoT device 120 and/or the service server 130. The transmitter 132*b* may be connected to the communication network 101 so as to transmit a wired/wireless signal to the IoT device 120 and/or the service server 130.

The service server 130 may transmit/receive, via the communication unit 132, data (e.g., device information on the electronic device, device information on the IoT device, an IoT device list, and an instruction for controlling the operation of the IoT device) to/from the multiple electronic devices 110, 110-1, . . . , and 110-N and the multiple IoT devices 120, 120-1, . . . , and 120-M.

The multiple electronic devices 110, 110-1, . . . , and 110-N and the multiple IoT devices 120, 120-1, . . . , and 120-M may be registered in the service server 130 so that the multiple IoT devices 120, 120-1, . . . , and 120-M belonging to the same brand and/or different brands are operated in conjunction with each other.

As an embodiment, the service server 130 may receive data (e.g., device information on the IoT device, and an IoT device list) from the multiple IoT devices 120, 120-1, . . . , and 120-M so that the multiple IoT devices 120, 120-1, . . . , and 120-M belonging to the same brand and/or different brands operate in conjunction with each other. The service server 130 may receive data (e.g., device information on the electronic device, and an instruction for controlling the operation of the IoT device) from the multiple electronic devices 110, 110-1, . . . , and 110-N so that the multiple IoT devices 120, 120-1, . . . , and 120-M belonging to the same brand and/or different brands operate in conjunction with each other. The service server 130 may transmit data (e.g., device information on the IoT device, an IoT device list, and an instruction for controlling the operation of the IoT device) to the multiple electronic devices 110, 110-1, . . . , and 110-N so that the multiple IoT devices 120, 120-1, . . . , and 120-M belonging to the same brand and/or different brands operate in conjunction with each other.

The processor 134 may be connected to the communication unit 132 and the memory 136. The processor 134 may execute software (e.g., the program 1040 in FIG. 1) to control the communication unit 132 and the memory 136, and perform various data processing or calculation. The processor 134 may include a device monitoring unit 134*a*, an instruction manager 134*b*, and a data updating unit 134*c*.

The device monitoring unit 134*a* may receive pieces of first device information on the multiple IoT devices 120, 120-1, . . . , and 120-M, and store the received pieces of first device information in the memory 136. The device monitoring unit 134*a* may receive pieces of second device information on the multiple electronic devices 110, 110-1, . . . , and 110-N, and store the received pieces of second device information in the memory 136.

The device monitoring unit 134*a* may register a list of the multiple IoT devices 120, 120-1, . . . , and 120-M operated by an instruction from the multiple electronic devices 110, 110-1, . . . , and 110-N. The device monitoring unit 134*a* may store a list (hereinafter, IoT device list) of the multiple IoT devices 120, 120-1, . . . , and 120-M in the memory 136. The device monitoring unit 134*a* may register an IoT device list corresponding to each of the multiple electronic devices 110, 110-1, . . . , and 110-N, and store the IoT device list corresponding to each of the multiple electronic devices 110, 110-1, . . . , and 110-N in the memory 136.

The device monitoring unit 134*a* may monitor a change of a state of the multiple IoT devices 120, 120-1, . . . , and 120-M, based on a pre-registered IoT device list.

As an embodiment, the device monitoring unit 134*a* may monitor whether a state (e.g., power on, power off, or a standby mode) of the IoT device 120 has been changed. Specifically, the device monitoring unit 134*a* may detect execution of an operation by the IoT device 120. The execution of an operation by the IoT device 120 may include the IoT device 120 being changed from a power-off state to a power-on state, and the IoT device 120 being changed from a standby mode state to a power-on state.

The device monitoring unit 134*a* may monitor whether a new IoT device has been added, based on a pre-registered IoT device list. In addition, the device monitoring unit 134*a* may monitor whether a pre-registered IoT device has been deleted (or removed), based on a pre-registered IoT device list.

As an embodiment, an IoT device (e.g., home appliance) in a home, which is operated by an instruction of an electronic device, may be newly registered, and a pre-registered IoT device (e.g., home appliance) may be deleted (or removed). Therefore, the device monitoring unit 134*a* may monitor a state (e.g., new registration, deletion, power on, and power off of an IoT device) of an IoT device (e.g., home appliance) in a home, based on an IoT device list. The device monitoring unit 134*a* may provide, to the data updating unit 134*c*, information on a state (e.g., new registration, deletion, power on, and power off of an IoT device) of an IoT device (e.g., home appliance) in a home.

The data updating unit 134*c* may update an IoT device list to reflect new addition and deletion (removal) of an IoT device, and store the updated IoT device list in the memory 136.

Device information on the multiple electronic devices 110, 110-1, . . . , and 110-N and device information on the multiple IoT devices 120, 120-1, . . . , and 120-M may be stored in the memory 136. A list of the multiple IoT devices 120, 120-1, ..., and 120-M operated by an instruction of each electronic device may be stored in the memory 136. The memory 136 may store various data used by the processor 134 of the service server 130. Data stored in the memory 136 may include, for example, software (e.g., the program 1040 in FIG. 1), and input data or output data related to a command related thereto. The memory 136 may include a volatile memory (e.g., the volatile memory 1032 in FIG. 1) and a non-volatile memory (e.g., the non-volatile memory 1034 in FIG. 1). A program stored in the memory 136 may be stored as software, and may include, for example, an operating system (e.g., the operating system 1042 in FIG. 1), a middleware (e.g., the middleware 1044 in FIG. 1), or an application (e.g., the application 1046 in FIG. 1).

The instruction manager 134b may receive instructions from the multiple electronic devices 110, 110-1, ..., and 110-N via the receiver 132a. The instruction manager 134b may store the received instructions in the memory 136. As an embodiment, one IoT device may be operated by one instruction from the electronic device 110. As an embodiment, multiple IoT devices may be operated in connection with each other by one instruction from the electronic device 110.

The instruction manager 134b may obtain a particular instruction among instructions stored in the memory 136. The instruction manager 134b may transmit the obtained instruction to the multiple electronic devices 110, 110-1, ..., and 110-N via the transmitter 132b. As an embodiment, the instruction manager 134b may detect one instruction (or multiple instructions) suitable for a particular electronic device (e.g., the electronic device 110) among instructions stored in the memory 136. That is, the instruction manager 134b may detect one instruction (or multiple instructions) to operate an IoT device (or multiple IoT devices) registered together with an electronic device among instructions stored in the memory 136. The instruction manager 134b may obtain the detected one instruction (or multiple instructions) from the memory 136. The instruction manager 134b may transmit the obtained one instruction (or multiple instructions) to one electronic device (or multiple electronic devices) via the transmitter 132b.

The instruction manager 134b may detect a second IoT device similar or identical to a first IoT device operable by a first electronic device. The second IoT device may be operated by a second electronic device different from the first electronic device. As an embodiment, the instruction manager 134b may detect the second IoT device similar or identical to the first IoT device, based on an IoT device list stored in the memory 136, and detect an instruction used to operate the second IoT device. In addition, the instruction manager may detect the second electronic device operating the second IoT device among electronic devices registered in the service server 130.

As an embodiment, when the first IoT device operated by the first electronic device and the second IoT device operated by the second electronic device are similar or identical to each other, the instruction manager 134b may obtain a first instruction to control the operation of the first IoT device from the memory 136. The instruction manager 134b may transmit the first instruction for operation of the first IoT device to the second electronic device via the transmitter 132b. The disclosure is not limited thereto, and the instruction manager 134b may transmit the first instruction for operation of the first IoT device to multiple electronic devices via the transmitter 132b.

As an embodiment, the service server 130 may receive, from a third electronic device, a new third instruction to operate a third IoT device similar or identical to the first IoT device (or the second IoT device). The instruction manager 134b may store the third instruction received from the third electronic device in the memory 136. The service server 130 may detect a power-on state, a power-off state, and a standby mode state of the first IoT device (or the second IoT device). When the first IoT device (or the second IoT device) has been detected to be powered on, the instruction manager 134b may transmit the third instruction to the first electronic device (or the second electronic device) via the transmitter 132b.

Figure 5A:
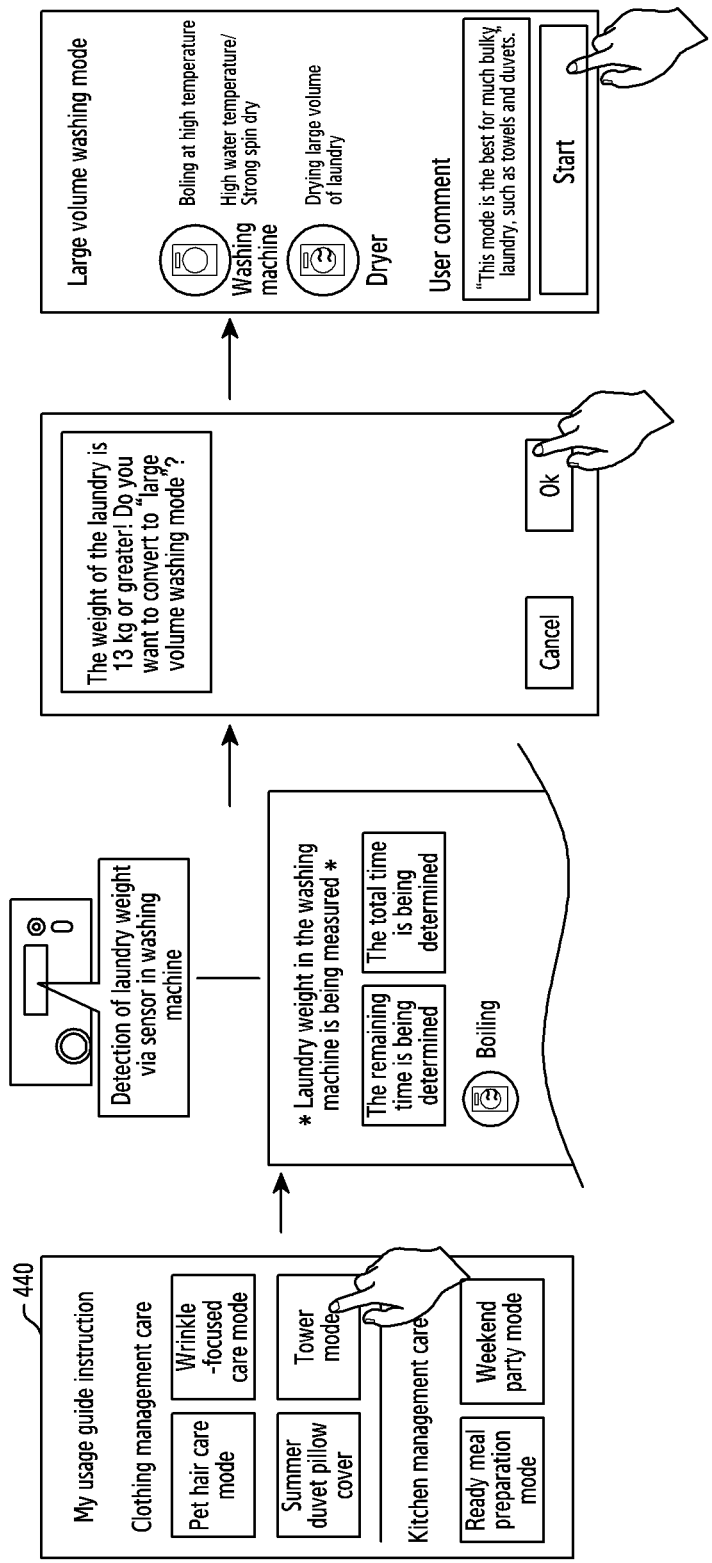
FIG. 5A illustrates an example execution of a method, according to various embodiments, in which an electronic device operates an IoT device by using an instruction, and shares the instruction with a different electronic device.

FIG. 5A illustrates an example execution of a method according to various embodiments, in which an electronic device operates an IoT device by using an instruction, and shares the instruction with a different electronic device.

Referring to FIG. 3 and FIG. 5A, in operation S1, the first electronic device 110 may generate a timeline-type instruction for a function of linking the multiple IoT devices 120 to 120-M. The first electronic device 110 may provide the generated timeline-type instruction via a user interface. The first electronic device 110 may find an association between the multiple IoT devices 120 to 120-M, and propose the association as one household activity. The first electronic device 110 may calculate an operation order between the IoT devices, an operation time interval, and a termination time for each of detailed configuration values of the IoT devices so as to connect operations of the IoT devices. The first electronic device 110 may provide, on a screen, an instruction in which operations of the IoT devices are connected. That is, the multiple IoT devices 120 to 120-M may be operated in connection with each other through the instruction in which operations of the IoT devices are connected.

In operation S2, the first electronic device 110 may display the instruction and usage guide information on a screen so as to allow a user to identify the instruction and usage guide information. The first electronic device 110 may provide a function of editing the instruction and usage guide information so as to allow the user to edit the instruction and usage guide information. The first electronic device 110 may obtain information (e.g., detection information of an IoT device) on the weight of laundry from an IoT device (e.g., washing machine), and recommend (e.g., when the weight of the laundry is equal to or greater than 13 kg, recommend a conversion to a "large volume washing mode") a change of the instruction, based on the weight of the laundry. The first electronic device 110 may provide a function of editing an operation mode, an operation value, an operation time, an operation order, and an operation interval for each IoT device to be matched to the recommendation of change of the instruction and a function of editing the user's comment.

In operation S3, the first electronic device 110 may transmit the instruction to an IoT device so as to execute an operation of the IoT device.

As an embodiment, the first electronic device 110 may directly transmit the instruction to an IoT device via wireless communication. As an embodiment, the first electronic device 110 may transmit the instruction to the service server 130 via wireless communication, and the service server 130 may transmit the instruction to an IoT device.

In operation S4, the first electronic device 110 may provide a function of storing the instruction so as to allow the user to store the edited (or used) instruction as a personal mode. In addition, the first electronic device 110 may transmit the edited (or used) instruction to the service server 130 (operation S4). As described above, the first electronic device 110 may transmit the edited (or used) instruction to the service server 130, thereby allowing users holding identical (or similar) IoT devices to share the instruction.

Figure 5B:
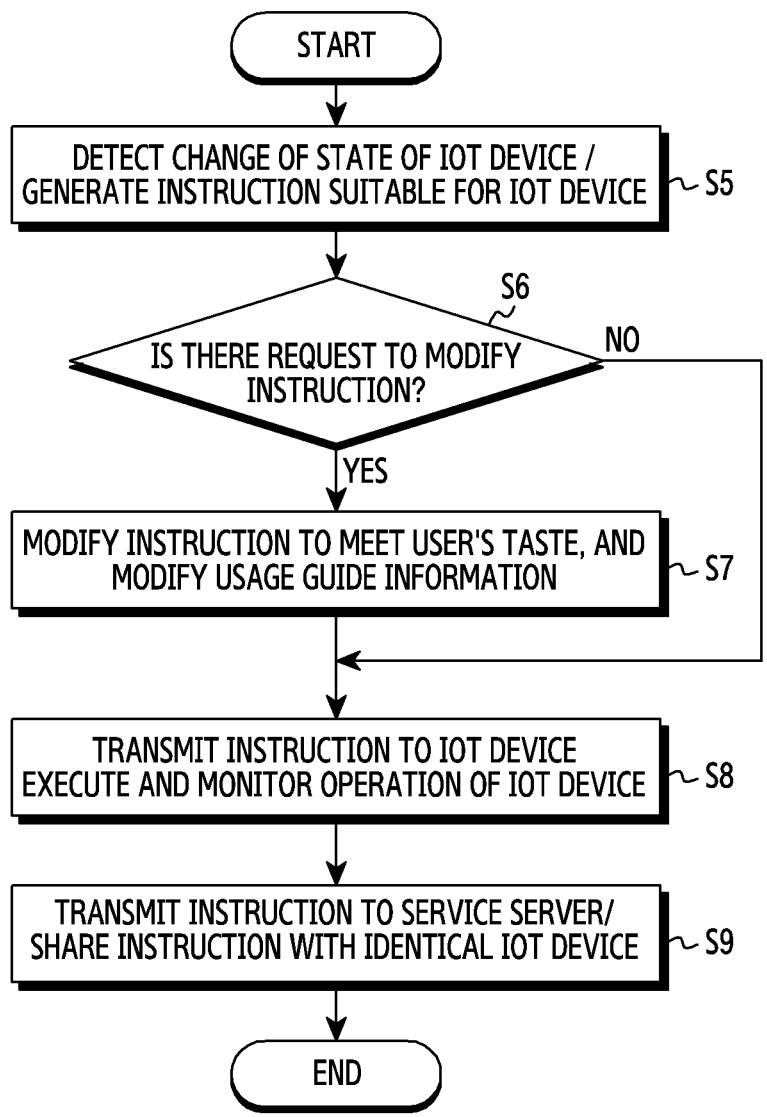
FIG. 5B is a flowchart illustrating an operation method of an electronic device, a service server, and an IoT device, according to various embodiments.

FIG. 5B is a flowchart illustrating an operation method of an electronic device 110, a service server 130, and an IoT device 120 according to various embodiments.

Referring to FIG. 3 and FIG. 5B, in operation S5, the first electronic device 110 may detect a change of an operation state (e.g., power on, power off, or a standby mode) of the first IoT device 120. The first electronic device 110 may generate (or use a stored instruction) an instruction suitable for the first IoT device 120.

In operation S6, the first electronic device 110 may determine whether there is a request to modify the instruction, which is sent by a user's selection.

When there is a request to modify the instruction, the first electronic device 110 may, in operation S7, provide a function of modifying the instruction so as to modify the instruction to meet the user's taste. In addition, the electronic device 110 may provide a function of modifying usage guide information so as to modify the usage guide information to correspond to the modification of the instruction.

In operation S8, the first electronic device 110 may transmit the instruction to the IoT device so as to execute an operation of the IoT device. In addition, the first electronic device 110 may monitor execution of an operation by the IoT device.

When there is no request to modify the instruction in operation S6, operation S8 may be executed.

In operation S9, the first electronic device 110 may transmit the instruction used without modification or the modified and used instruction to the service server 130. The service server 130 may update the instruction received from the first electronic device 110, and may allow users holding identical IoT devices to share the instruction.

Figure 5C:
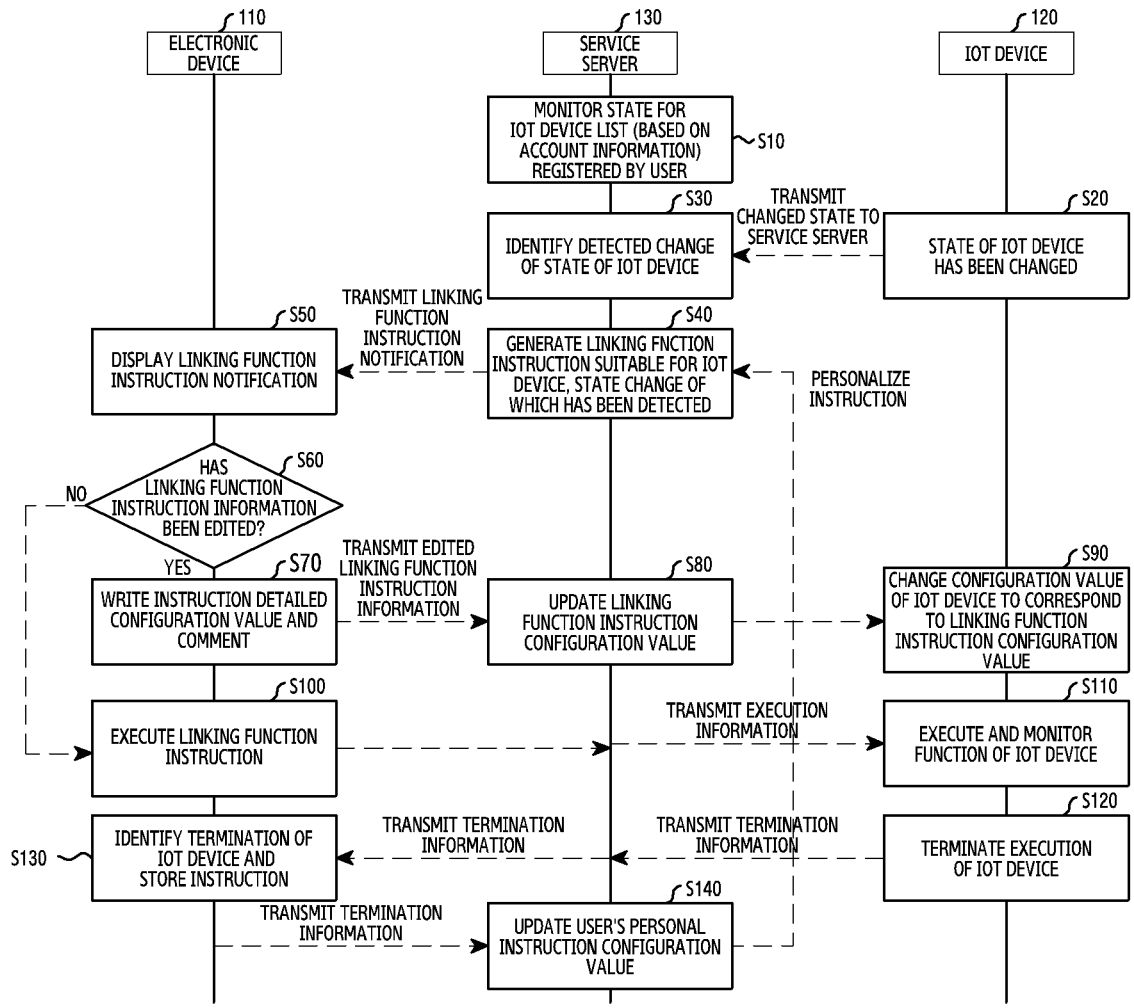
FIG. 5C is a sequence diagram illustrating a method for sharing an instruction of an identical or similar IoT device between electronic devices, according to various embodiments.

FIG. 5C is a sequence diagram illustrating a method for sharing an instruction of an identical or similar IoT device between electronic devices according to various embodiments. FIG. 6 illustrates an example set of instruction generation conditions and result values according to various embodiments.

Referring to FIG. 3, FIG. 5C, and FIG. 6, the multiple electronic devices 110, 110-1, . . . , and 110-N may be connected to the service server 130, and the multiple IoT devices 120, 120-1, . . . , and 120-M may be connected to the service server 130. The multiple electronic devices 110, 110-1, . . . , and 110-N and the multiple IoT devices 120, 120-1, . . . , and 120-M may be connected to each other via the service server 130. FIG. 5C illustrates one first electronic device 110 and one first IoT device 120 being connected to the service server 130 as an example. The first electronic device 110 and the first IoT device 120 may be connected to each other via the service server 130. The disclosure is not limited thereto, and the first electronic device 110 and multiple IoT devices may be directly connected to each other.

The first electronic device 110 and the first IoT device 120 may be located in a particular space (e.g., home), and the first electronic device 110 and the first IoT device 120 may be registered in the service server 130. The first IoT device 120 may be a home appliance operated by an instruction from the first electronic device 110.

As an embodiment, the first electronic device 110 and the first IoT device 120 located in a particular space (e.g., home) may be registered in the service server 130 by using individual IDs. The first electronic device 110 may be connected to the first IoT device 120 and the service server 130 via wireless communication. The ID of the first electronic device 110 and the ID of the first IoT device 120 may be identical to or different from each other. Specifically, the first electronic device 110 and the first IoT device 120 located in a particular space (e.g., home) may be registered in the service server 130 by using the same IDs. The electronic device 110 may be connected to the first IoT device 120 and the service server 130 via wireless communication. The disclosure is not limited thereto, and the first electronic device 110 and the first IoT device 120 may be registered in the service server 130 by using different IDs. The first electronic device 110 may be connected to the first IoT device 120 and the service server 130 via wireless communication.

As an embodiment, the first electronic device 110 may directly register the first IoT device 120 located in a particular space (e.g., home) without using the service server 130. The electronic device 110 may be connected to the first IoT device 120 via wireless communication. The first electronic device 110 may register the first IoT device 120, based on an ID issued to the first IoT device 120. The first IoT device 120 may also directly register the first electronic device 110 located in a particular space (e.g., home). The first IoT device 120 may also directly register the first electronic device 110, based on an ID issued to the first electronic device 110. The ID of the first electronic device 110 and the ID of the first IoT device 120 may be identical to or different from each other.

The service server 130 may register and manage a list of IoT devices operated by an instruction from the electronic device 110. In addition, the service server 130 may register and manage device information on the multiple IoT devices 120, 120-1, . . . , and 120-M connected to the electronic device 110.

Device information on the first IoT device 120 operated by the first electronic device 110 may be shared with other electronic devices via the service server 130. Similarly, device information on IoT devices operated by other electronic devices may be shared with the first electronic device 110 via the service server 130.

A second instruction of a second IoT device operated by a second electronic device may be registered in the service server 130. The first electronic device 110 may receive the second instruction to control the operation of the second IoT device from the service server 130. The first electronic device 110 may operate the first IoT device 120 located in a particular space (e.g., home) by using second instructions to control the operation of the second IoT device. The disclosure is not limited thereto, and the first electronic device 110 may operate multiple IoT devices in connection with each other by using the second instructions to control the operation of the second IoT device, the multiple IoT devices being located in a particular space (e.g., home).

As an embodiment of the disclosure, in operation S10, the service server 130 may monitor a change of states of multiple IoT devices connected to the first electronic device 110, based on a pre-registered IoT device list. That is, the service server 130 may monitor whether a new IoT device has been added, based on a pre-registered IoT device list. In addition, the service server 130 may monitor whether a pre-registered IoT device has been deleted, based on a pre-registered IoT device list. In addition, the service server 130 may monitor an operation state (e.g., power on, power off, or a standby mode) of a pre-registered IoT device.

In operation S20, the state of the first IoT device 120 operable by the first electronic device 110 may be changed.

The change of the state of the first IoT device 120 may include a trigger (e.g., power on, power off, and a standby mode of the first IoT device 120) state caused by a start of the operation of the first IoT device 120 connected to the first electronic device 110. As an embodiment, when the first IoT device 120 is powered on by a user, the first IoT device 120 may transmit, to the service server 130, IoT device state information notifying generation of power on. The first IoT device 120 may generate IoT device state information including information on power off and a standby mode as well as a power-on state, and transmit the generated IoT device state information to the service server 130.

In operation S30, the service server 130 may receive IoT device state information which is received from the first IoT device 120. The service server 130 may receive IoT device state information notifying power off of the first IoT device 120 and a standby mode of the first IoT device 120 as well as a power-on state of the first IoT device 120, as illustrated in FIG. 6. The service server 130 may detect (or identify) a change of the state of the first IoT device 120, based on the received IoT device state information.

In operation S40, the service server 130 may generate a first instruction enabling operation of the first IoT device 120, the state change of which has been detected. The disclosure is not limited thereto, and the service server 130 may generate the first instruction including a function of linking the first IoT device 120 and other IoT devices. The first IoT device 120 and the other IoT devices may be operated by the first electronic device 110 simultaneously or sequentially in connection with each other. The service server 130 may generate a linking function instruction notification including the first instruction. The service server 130 may transmit, to the first electronic device 110, the linking function instruction notification including the first instruction.

As an embodiment, when a change in an IoT device (e.g., air purifier) occurs, and the air purifier recognizes pollution, the service server 130 may recognize a change in a sensor of the air purifier, and identify other IoT devices operable together with (simultaneously or sequentially) the air purifier by using the air purifier recognizing the pollution. That is, the service server 130 may obtain information on different IoT device operable together with (simultaneously or sequentially) the air purifier. The service server 130 may transmit, to the first electronic device 110, the information on the different IoT device operable together with (simultaneously or sequentially) the air purifier. Therefore, the first electronic device 110 may obtain the information on the different IoT device operable together with (simultaneously or sequentially) the air purifier. The disclosure is not limited thereto, and the first electronic device 110 knows IoT devices located in a particular space, and thus may directly identify a different IoT device operable together with (simultaneously or sequentially) the air purifier.

As an embodiment, the service server 130 may identify IoT devices linkable to each other for each household activity, and group simultaneously or sequentially operable IoT devices. The service server 130 may group multiple IoT devices (e.g., a washing machine, a dryer, an air dresser, and a shoe care device). The service server 130 may generate the first instruction enabling operation of the multiple IoT devices (e.g., a washing machine, a dryer, an air dresser, and a shoe care device) in connection with each other (simultaneously or sequentially). The service server 130 may transmit, to the first electronic device 110, a linking function instruction notification including the first instruction. Thereafter, the first electronic device 110 may operate IoT devices performing similar household activities, such as a washing machine, a dryer, an air dresser, and a shoe care device, in connection with each other (simultaneously or sequentially) by using the first instruction received from the service server 130.

As an embodiment, the service server 130 may detect the first instruction for control of an operation of an IoT device identical (or similar) to the first IoT device 120 among multiple instructions stored in a memory (e.g., the memory 136 in FIG. 4). The service server 130 may transmit, to the first electronic device 110, the detected first instruction. Thereafter, the first electronic device 110 may operate an IoT device (e.g., a dryer, an air dresser, and a shoe care device) identical (or similar) to the first IoT device 120 (e.g., a washing machine), in connection with same (simultaneously or sequentially) by using the first instruction received from the service server 130.

As an embodiment, the service server 130 may detect multiple instructions for control of operations of multiple IoT devices identical (or similar) to the first IoT device 120 among multiple instructions stored in a memory (e.g., the memory 136 in FIG. 4). The service server 130 may integrate the detected multiple instructions to generate the first instruction, and transmit the generated first instruction to the first electronic device 110. Thereafter, the first electronic device 110 may operate the multiple IoT devices in connection with each other (simultaneously or sequentially) by using the first instruction received from the service server 130 obtained by integrating the multiple instructions.

When integrating the multiple instructions, the service server 130 may detect a function control menu commonly included in the multiple instructions, and generate the first instruction including the common function control menu. The disclosure is not limited thereto, and when integrating the multiple instructions, the service server 130 may detect one function control menu (or multiple function menus) recently newly registered in a temporal order. The service server 130 may generate the first instruction including a function control menu commonly included in the multiple instructions, and newly registered one or more function control menus.

As an embodiment, the service server 130 may generate the first instruction so as to allow multiple IoT devices for each household activity to operate in connection with each other. The service server 130 may identify other users having the same IoT devices. The service server 130 may select an instruction used many times by the other users having the same IoT devices, and may preferentially transmit the instruction used many times by the other users to the first electronic device 110.

In operation S50, the first electronic device 110 may receive a linking function instruction notification from the service server 130. The first electronic device 110 may provide (screen display, sound output) the received linking function instruction notification to the user by using a display device (e.g., the display device 1060 in FIG. 1).

In operation S60, the first electronic device 110 may provide a function of modifying (or editing) instruction information so as to allow the user to modify (or edit) the first instruction. The first electronic device 110 may edit a function of linking IoT devices according to the user's selection. The first electronic device 110 may determine whether the first instruction has been edited by the user.

When a result of the determination in operation S60 indicates that the first instruction has been edited by the user's selection, the first electronic device 110 may generate a detailed configuration value and a comment of the edited first instruction (operation S70). In operation S70, the first electronic device 110 may transmit first instruction information including the edited linking function to the service server 130. Configuration elements of the detailed configuration value of the first instruction may include operation modes (e.g., a cooling mode, an air blowing mode, and a drying mode of an air conditioner) and a total operation time of the IoT device. In addition, the configuration elements of the first instruction may include an operation order of several operation modes of the IoT device and an operation time for each operation mode when the operation modes are sequentially operated. The first electronic device 110 may modify elements of the detailed configuration value of the first instruction, based on the user's selection, and update the first instruction to reflect the modified detailed configuration value.

In operation S80, the service server 130 may receive the first instruction information including the edited linking function. The service server 130 may update a linking function instruction configuration value, based on the first instruction information including the edited linking function. The service server 130 may transmit, to the first IoT device 120, the updated linking function instruction configuration value. The first electronic device 110 may change the linking function instruction configuration value to meet the user's situation or taste. When the linking function instruction configuration of the IoT device is updated, the electronic device 110 may modify operation modes (e.g., a cooling mode, an air blowing mode, and a drying mode of an air conditioner) and a total operation time of the IoT device. In addition, when the linking function instruction configuration of the IoT device is updated, the electronic device 110 may modify an operation order of the operation modes of the IoT device and an operation time for each operation mode.

In operation S90, the first IoT device 120 may receive the updated linking function instruction configuration value from the service server 130. The first IoT device 120 may change a configuration value of the IoT device to correspond to the received updated linking function instruction configuration value.

The linking function instruction configuration value may be continuously stored and updated in the first electronic device 110 and the service server 130 so that the instruction configuration value is elaborated. As an embodiment, when an air purifier and an air dresser operate in connection with each other, an instruction configuration value for an operation mode of the air purifier and an operation mode of the air dresser may be different for each user. The instruction configuration value for the operation mode of the air purifier and the operation mode of the air dresser may be accumulated by several users, so that the instruction configuration value for the operation mode of the air purifier and the operation mode of the air dresser is elaborated.

When a result of the determination in operation S60 indicates that the first instruction information has not been edited, the first electronic device 110 may execute the linking function instruction for operation of multiple IoT devices by using the first instruction (S100). In operation S100, the first electronic device 110 may transmit information on execution of the linking function instruction to the IoT device 120. As an embodiment, the information on execution of the linking function instruction may be transmitted to the first IoT device 120 via the service server 130. As an embodiment, the information on execution of the linking function instruction may be directly transmitted to the first IoT device 120 from the first electronic device 110.

In operation S110, when the information on execution of the linking function instruction is not modified, the IoT device 120 may execute a function of the first IoT device 120 by using the configuration value of the IoT device included in information on execution of the original instruction, and monitor the execution of the function. When the linking function instruction information is modified, the first IoT device 120 may execute a function by using the changed configuration value of the IoT device, and monitor the execution of the function.

In operation S120, the first IoT device 120 may generate information on termination of the function execution when the function execution corresponding to the linking function instruction information is terminated. The first IoT device 120 may transmit the information on termination of the function execution to the electronic device 110 via the service server 130. As an embodiment, the first IoT device 120 may directly transmit the information on termination of the function execution to the first electronic device 110.

In operation S130, the first electronic device 110 may receive the information on termination of the function execution by the first IoT device 120. The first electronic device 110 may identify the termination of the function execution by the first IoT device 120, and store the executed first instruction. The first electronic device 110 may transmit the executed first instruction to the service server 130.

In operation S140, the service server 130 may update the user's personal instruction configuration value, based on the executed first instruction received from the first electronic device 110. When the linking function instruction configuration value is changed in operation S60, the service server 130 may update the user's personal instruction configuration value to reflect the change of the linking function instruction configuration value.

The first electronic device 110 may execute and modify an instruction, and obtain and re-execute an instruction stored in the memory 136. In addition, the first electronic device 110 may obtain an instruction stored in the memory 136, and modify and execute the instruction. In addition, the first electronic device 110 may transmit the modified instruction to the service server 130 so as to allow the modified instruction to be shared with other electronic devices.

Figure 7A:
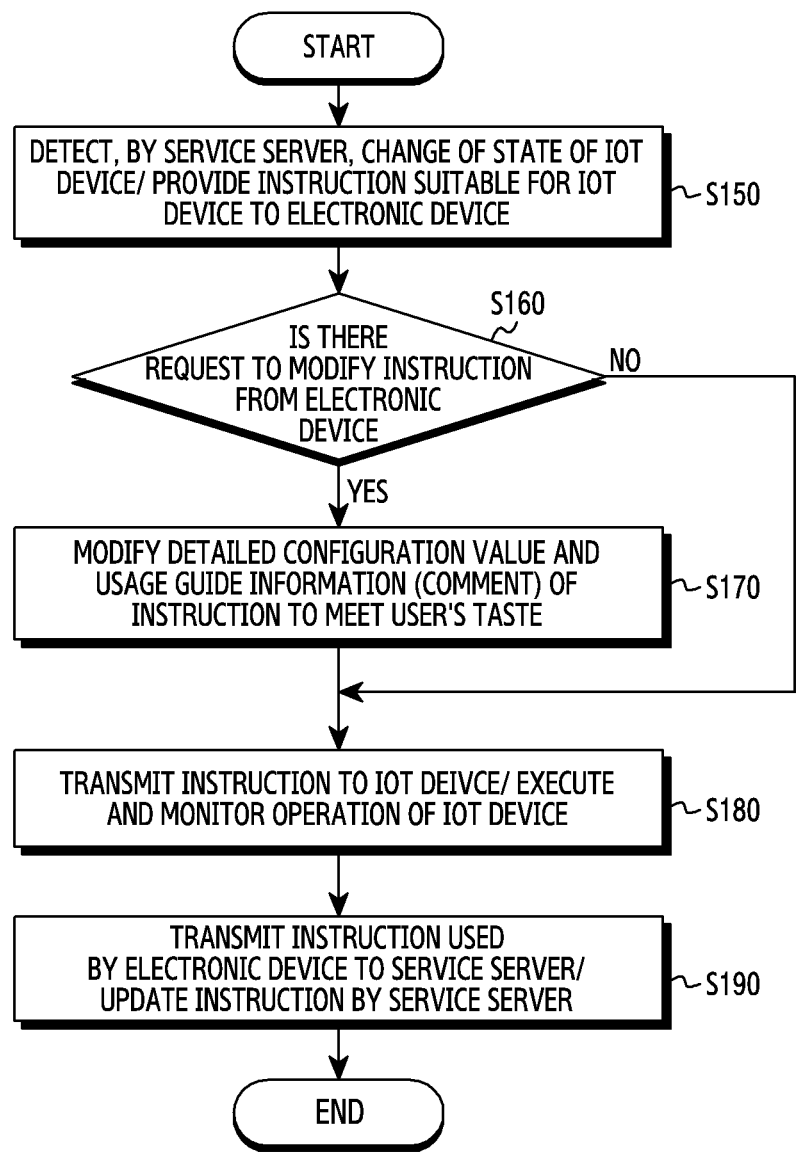
FIG. 7A is a flowchart illustrating a method, according to various embodiments, in which an electronic device shares an instruction of IoT devices, and operates the IoT devices.

FIG. 7A is a flowchart illustrating a method according to various embodiments, in which an electronic device shares an instruction of IoT devices, and operates the IoT devices.

Referring to FIG. 3 and FIG. 7A, in operation S150, the service server 130 may detect a change of an operation state (e.g., power on, power off, or a standby mode) of the first IoT device 120. The service server 130 may provide, to the first electronic device 110, an instruction suitable for the first IoT device 120.

In operation S160, the first electronic device 110 may determine whether modification of the instruction has been requested by a user's selection.

When there is a request to modify the instruction, the first electronic device 110 may, in operation S170, provide a function of modifying a detailed configuration value and usage guide information (e.g., a user comment) of the instruction to meet the user's taste.

In operation S180, the first electronic device 110 may transmit the instruction to the first IoT device 120 so as to execute an operation of the first IoT device 120. In addition, the first electronic device 110 may monitor execution of an operation by the first IoT device 120.

When a result of the determination in operation S160 indicates that there is no request to modify the instruction, operation S180 may be executed.

In operation S190, the first electronic device 110 may transmit the used instruction to the service server 130. The service server 130 may update the instruction received from the first electronic device 110. The service server 130 may share the instruction with other users holding IoT devices similar to the first IoT device 120.

Figure 7B:
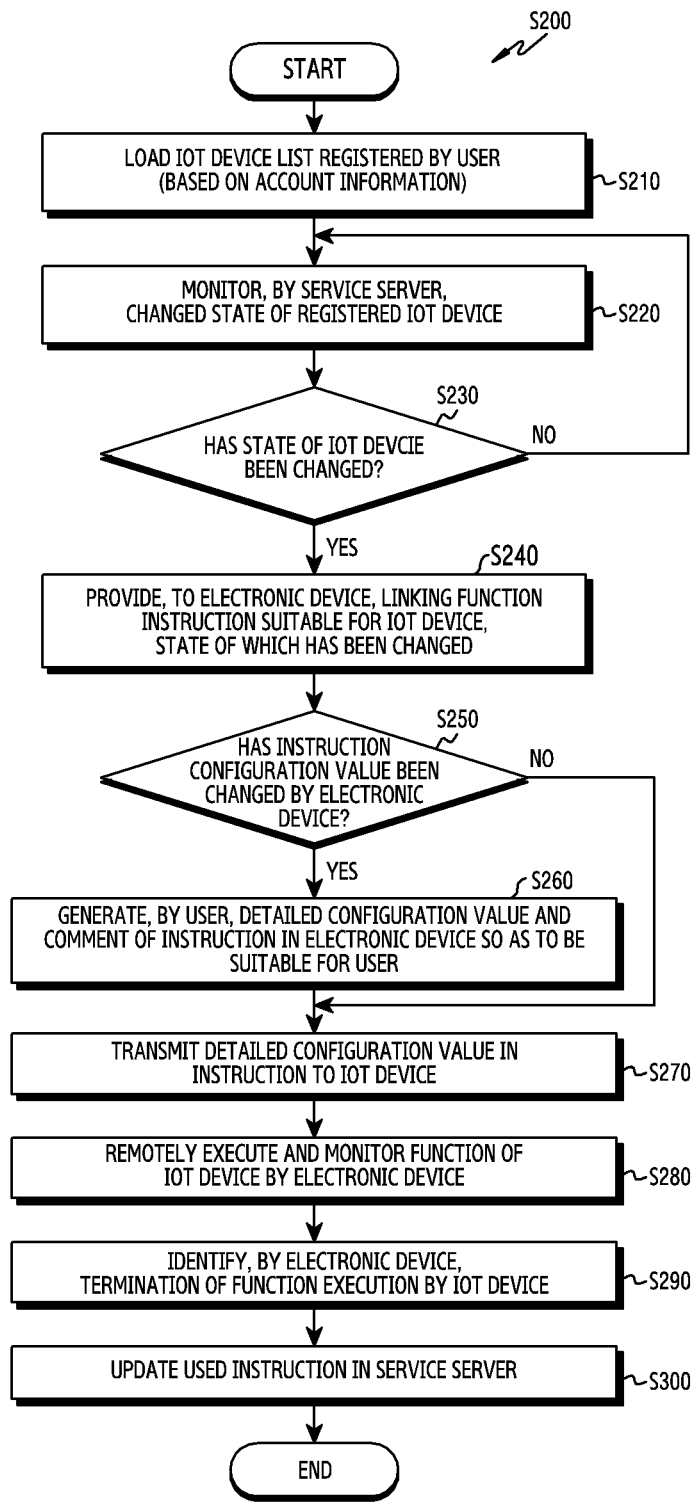
FIG. 7B is a flowchart illustrating a method, according to various embodiments, for sharing an instruction of IoT devices and operating the IoT devices.

FIG. 7B is a flowchart S200 illustrating a method according to various embodiments for sharing an instruction of IoT devices and operating the IoT devices.

Referring to FIG. 3 and FIG. 7B, in operation S210, an IoT device list of first IoT devices operable by the first electronic device 110 may be registered in the service server 130. The registration in the service server 130 may be performed according to an ID assigned for each electronic device. In addition, the registration in the service server 130 may be performed according to an ID assigned for each IoT device. The first electronic device 110 and the first IoT device 120 located in a particular space (e.g., home) may be registered in the service server 130 by using the same IDs. The disclosure is not limited thereto, and the first electronic device 110 and the first IoT device 120 located in a particular space (e.g., home) may be registered in the service server 130 by using different IDs. The service server 130 may obtain the IoT device list registered via the first electronic device 110.

In operation S220, the service server 130 may monitor a change of a state of an individual IoT device, based on the pre-registered IoT device list. As an embodiment, the service server 130 may monitor whether a new IoT device has been added and whether a pre-registered IoT device has been deleted (removed), based on the pre-registered IoT device list. As an embodiment, the service server 130 may monitor whether a state (e.g., power on, power off, or a standby mode) of the IoT device 120 operable by the first electronic device 110 has been changed. Specifically, the first electronic device 110 may detect execution of an operation by the IoT device. The execution of an operation by the IoT device may include the IoT device being changed from a power-off state to a power-on state, and the IoT device being changed from a standby mode state to a power-on state.

Figure 8:
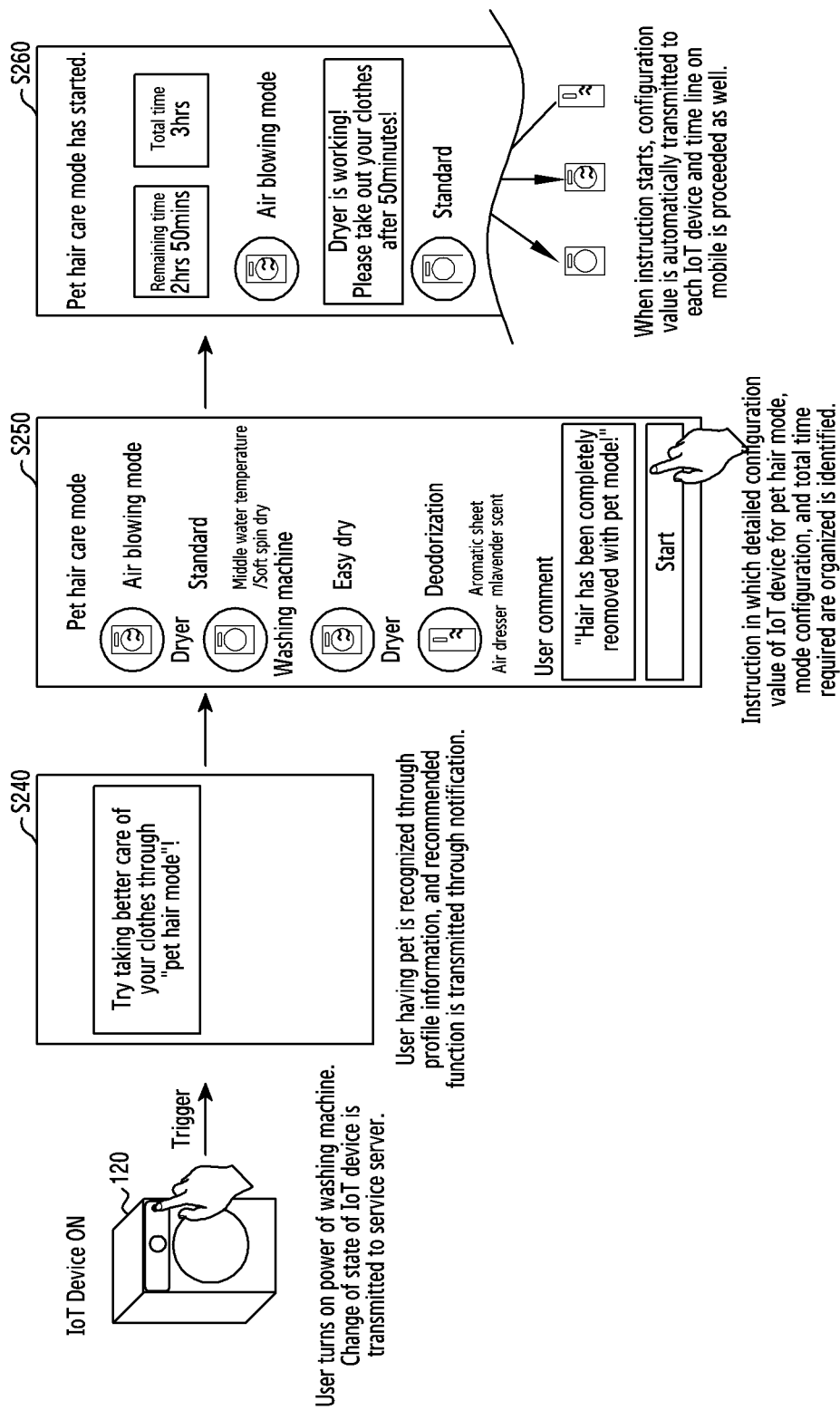
FIG. 8 illustrates an example execution of a method, according to various embodiments, in which an electronic device operates an IoT device by using an instruction.

FIG. 8 illustrates an example execution of a method according to various embodiments in which an electronic device operates an IoT device by using an instruction.

In relation to FIG. 8, in operation S230, the service server 130 may determine whether a state (e.g., new registration, power on, power off, or a standby mode) of the first IoT device 120 has been changed.

When a result of the determination in operation S230 indicates that the state (e.g., new registration, power on, power off, or a standby mode) of the first IoT device 120 has not been changed, the service server 130 may return to operation S220, and monitor a change of the state of the first IoT device 120.

When a result of the determination in operation S230 indicates that the state (e.g., new registration, power on, power off, or a standby mode) of the first IoT device 120 has been changed, the service server 130 may generate a linking function instruction suitable for the first IoT device 120, the state of which has been changed, or obtain a linking function instruction stored in the memory 136.

In operation S240, the service server 130 may provide, to the first electronic device 110, linking function instruction information suitable for the first IoT device 120, the state of which has been changed (e.g., power on).

As an embodiment, the service server 130 may identify IoT devices located together with the first electronic device 110 in a particular space (e.g., home). The service server 130 may provide, to the first electronic device 110, the linking function instruction information enabling the operation of the first IoT device 120 and the operation of other IoT devices operable in connection with the first IoT device 120.

FIG. 9 illustrates a classification of IoT devices 200 by product groups according to various embodiments.

In relation to FIG. 9, a service server (e.g., the service server 130 in FIG. 3 or the service server 130 in FIG. 5C) and an electronic device (e.g., the first electronic device 110 in FIG. 3 or the first electronic device 110 in FIG. 5C) may classify the IoT devices 200 (e.g., the multiple IoT devices 120, 120-1, . . . , and 120-M in FIG. 3) located in a particular space (e.g., home) by product groups. The IoT devices 200 may be located in a particular space (e.g., home) together with the first electronic device 110, and the IoT devices 200 may be registered in the service server 130 together with the electronic device (e.g., the first IoT device 110 in FIG. 3).

As an embodiment, the service server 130 and the electronic device 110 may classify IoT devices (e.g., an air conditioner, an air purifier, a humidifier, and a dehumidifier belonging to air care) having similar operation characteristics according to household activity (e.g., cleaning, cooking, food care, air care, clothing care, and body care) as the same product group. In addition, when an operation of a second IoT device (e.g., a dryer) is required by an operation of a first IoT device (e.g., a washing machine), the first IoT device (e.g., a washing machine) and the second IoT device (e.g., a dryer) may be classified as the same product group. Furthermore, IoT devices (e.g., an air purifier and an induction stove) (e.g., a clothing purifier and a humidifier) which are operable in connection with each other, but have different operation characteristics according to household activity may be classified by different product groups. That is, the service server 130 and the electronic device 110 may classify IoT devices (e.g., an air purifier and an induction stove) (e.g., a clothing purifier and a humidifier) which are operable in connection with each other, but belong to different product groups by different product groups.

An air care product group 210 may include an air conditioner, an air purifier, a humidifier, and a dehumidifier. A fabric care product group 220 may include a washing machine, a dryer, a clothing purifier, and a shoe care device. A food care product group 230 may include a refrigerator, a kimchi refrigerator, a wine refrigerator, and a hot/cold storage device. A cooking care product group 240 may include an oven, an induction stove/cooktop, an electric range, a microwave, and a hood. A cleaning care product group 250 may include a dry robot cleaner, a wet robot cleaner, a stick cleaner, and a dishwasher. A body care product group 260 may include an LED mask, a walking aid, a smart mirror, and an exercise IoT device. An entertainment product group 270 may include a display including a TV, a smart speaker, and a sound IoT device.

FIG. 10 illustrates an example linking of the IoT devices 200 and their respective functions for operation in connection with each other according to various embodiments.

In relation to FIG. 10, a service server (e.g., the service server 130 in FIG. 3 or the service server 130 in FIG. 5C) may classify IoT devices (e.g., the IoT devices 200 in FIG. 9) located in a particular space (e.g., home) together with an electronic device (e.g., the first electronic device 110 in FIG. 3 or the first electronic device 110 in FIG. 5C) by particular groups according to whether the IoT devices are linkable to each other. The service server 130 may generate linking function instruction information enabling IoT devices classified as a group to operate in connection with each other, and provide the linking function instruction information to the first electronic device 110.

As an embodiment, the service server 130 may classify IoT devices 310 belonging to different product groups as a type of IoT devices linked between different product groups, so as to allow the IoT devices to operate in connection with each other. The service server 130 may generate first linking function instruction information enabling parallel (or simultaneous) operation of the IoT devices 310 belonging to different product groups. The service server 130 may transmit, to the first electronic device 110, the first linking function instruction information.

When execution (e.g., power on or a change from a standby mode to power on) of an operation of a robot cleaner is detected, the service server 130 may generate first linking function instruction information enabling the robot cleaner and an air purifier to operate together. The service server 130 may transmit, to the first electronic device 110, the first linking function instruction information. The first electronic device 110 may operate the robot cleaner and the air purifier together by using the received first linking function instruction information. Through this operation, the quality of indoor air may be managed together while cleaning is performed by the robot cleaner.

When execution (e.g., power on or a change from a standby mode to power on) of an operation of an induction stove is detected, the service server 130 may generate first linking function instruction information enabling the induction stove and a dishwasher to operate together. The service server 130 may transmit, to the first electronic device 110, the first linking function instruction information. The first electronic device 110 may operate the induction stove and the dishwasher together by using the received first linking function instruction information. Through this operation, after cooking using the induction stove, cleaning may be performed together using the dishwasher.

When execution (e.g., power on or a change from a standby mode to power on) of an operation of an oven is detected, the service server 130 may generate first linking function instruction information enabling the oven and a hot/cold storage device to operate together. The service server 130 may transmit, to the first electronic device 110, the first linking function instruction information. The first electronic device 110 may operate the oven and the hot/cold storage device together by using the received first linking function instruction information. Through this operation, the management of food temperature may be performed using the hot/cold storage device during cooking using the oven.

As an embodiment, the service server 130 may generate second linking function instruction information enabling sequential operation of the IoT devices 310 belonging to different product groups. The service server 130 may transmit, to the first electronic device 110, the second linking function instruction information.

When execution (e.g., power on or a change from a standby mode to power on) of an operation of a clothing purifier is detected, the service server 130 may generate second linking function instruction information enabling sequential operation of the clothing purifier and a dehumidifier. The service server 130 may transmit, to the first electronic device 110, the second linking function instruction information. The first electronic device 110 may sequentially operate the clothing purifier and the dehumidifier by using the received second linking function instruction information. Through this operation, after clothing care using the clothing purifier, the management of indoor (e.g., a dressing room) humidity may be performed using the dehumidifier.

When execution (e.g., power on or a change from a standby mode to power on) of an operation of an LED mask is detected, the service server 130 may generate second linking function instruction information enabling sequential operation of the LED mask and a smart speaker. The service server 130 may transmit, to the first electronic device, the second linking function instruction information. The first electronic device may sequentially operate the LED mask and the smart speaker by using the received second linking function instruction information. Through this operation, while skin care is executed using the LED mask, audio book playback (or music playback) may be performed using the smart speaker.

As an embodiment, the service server 130 may classify IoT devices 320 belonging to the same product group as a type of IoT devices linked between the same product groups, so as to allow the IoT devices to operate in connection with each other. The service server 130 may generate third linking function instruction information enabling parallel (or simultaneous) operation of the IoT devices 320 belonging to the same product group. The service server 130 may transmit, to the first electronic device 110, the third linking function instruction information.

When execution (e.g., power on or a change from a standby mode to power on) of an operation of an induction stove is detected, the service server 130 may generate third linking function instruction information enabling the induction stove and a hood to operate together. The service server 130 may transmit, to the first electronic device 110, the third linking function instruction information. The first electronic device 110 may operate the induction stove and the hood together by using the received third linking function instruction information. Through this operation, after cooking using the induction stove, air discharge may be performed together using the hood.

When execution (e.g., power on or a change from a standby mode to power on) of an operation of an air conditioner is detected, the service server 130 may generate third linking function instruction information enabling the air conditioner and an air purifier to operate together. The service server 130 may transmit, to the first electronic device 110, the third linking function instruction information. The first electronic device 110 may operate the air conditioner and the air purifier together by using the received third linking function instruction information. Through this operation, during the management of indoor temperature using the air conditioner, the quality of indoor air may be managed using the air purifier.

When execution (e.g., power on or a change from a standby mode to power on) of an operation of a clothing purifier is detected, the service server 130 may generate third linking function instruction information enabling the clothing purifier and a shoe care device to operate together. The service server 130 may transmit, to the first electronic device 110, the third linking function instruction information. The first electronic device 110 may operate the clothing purifier and the shoe care device together by using the received third linking function instruction information. Through this operation, while clothing care is performed using the clothing purifier, shoe care may be performed using the shoe care device.

When execution (e.g., power on or a change from a standby mode to power on) of an operation of a television (TV) is detected, the service server 130 may generate third linking function instruction information enabling the television (TV) and a sound IoT device to operate together. The service server 130 may transmit, to the first electronic device 110, the third linking function instruction information. The first electronic device 110 may operate the television (TV) and the sound IoT device together by using the received third linking function instruction information. Through this operation, the sound IoT device may be executed during execution of the television (TV).

As an embodiment, the service server 130 may generate fourth linking function instruction information enabling sequential operation of the IoT devices 320 belonging to the same product group. The service server 130 may transmit, to the first electronic device 110, the fourth linking function instruction information.

When execution (e.g., power on or a change from a standby mode to power on) of an operation of a washing machine is detected, the service server 130 may generate fourth linking function instruction information enabling sequential operation of the washing machine and a dryer. The service server 130 may transmit, to the first electronic device 110, the fourth linking function instruction information. The first electronic device 110 may sequentially operate the washing machine and the dryer by using the received fourth linking function instruction information. Through this operation, after washing clothes using the washing machine, the clothes may be dried using the dryer.

When execution (e.g., power on or a change from a standby mode to power on) of an operation of a dry robot cleaner is detected, the service server 130 may generate fourth linking function instruction information enabling sequential operation of the dry robot cleaner and a wet robot cleaner. The service server 130 may transmit, to the first electronic device 110, the fourth linking function instruction information. The first electronic device 110 may sequentially operate the dry robot cleaner and the wet robot cleaner by using the received fourth linking function instruction information. Through this operation, after dry cleaning is performed using the dry robot cleaner, wet cleaning may be performed using the wet robot cleaner.

When execution (e.g., power on or a change from a standby mode to power on) of an operation of an induction stove is detected, the service server 130 may provide, to the first electronic device 110, fourth linking function instruction information enabling sequential operation of the induction stove and an oven. The first electronic device 110 may sequentially operate the induction stove and the oven by using the received fourth linking function instruction information. Through this operation, after food cooking is performed using the induction stove, food cooking may executed using the oven.

In relation to FIG. 9 and FIG. 10 together, the service server 130 may generate fifth linking function instruction information enabling the IoT devices 200 classified by groups to operate in connection with each other, and provide the fifth linking function instruction information to the first electronic device 110.

The service server 130 may classify IoT devices 330 belonging to different product groups as a type of IoT devices linked between different product groups, so as to allow the IoT devices to operate in connection with each other. The service server 130 may generate fifth linking function instruction information enabling parallel and/or sequential operation of the IoT devices 330 belonging to different product groups. The service server 130 may transmit, to the first electronic device 110, the fifth linking function instruction information.

As an embodiment, the service server 130 may generate fifth linking function instruction information enabling parallel and/or sequential operation of multiple first IoT devices (e.g., an induction stove and a hood) included in the cooking care product group 240 and multiple second IoT devices (e.g., an air conditioner and an air purifier) included in the air care product group 210. The service server 130 may transmit, to the first electronic device 110, the fifth linking function instruction information. The first electronic device 110 may parallelly and/or sequentially operate the multiple first IoT devices (e.g., an induction stove and a hood) included in the cooking care product group 240 and the multiple second IoT devices (e.g., an air conditioner and an air purifier) included in the air care product group 210 by using the fifth linking function instruction information. Through this operation, food cooking may be executed using the IoT devices of the cooking care product group 240, and air quality may be managed using the IoT devices of the air care product group 210.

As an embodiment, the service server 130 may generate fifth linking function instruction information enabling parallel and/or sequential operation of multiple first IoT devices (e.g., a dry robot cleaner and a wet robot cleaner) included in the cleaning care product group 250 and one second IoT device (e.g., an air purifier) included in the air care product group 210. The service server 130 may transmit, to the first electronic device 110, the fifth linking function instruction information. The first electronic device 110 may parallelly and/or sequentially operate the multiple first IoT devices (e.g., a dry robot cleaner and a wet robot cleaner) included in the cleaning care product group 250 and the one second IoT device (e.g., an air purifier) included in the air care product group 210 by using the fifth linking function instruction information. Through this operation, after cleaning using the IoT devices of the cleaning care product group 250, air quality may be managed using the IoT device of the air care product group 210.

As an embodiment, the service server 130 may generate fifth linking function instruction information enabling parallel and/or sequential operation of multiple first IoT devices (e.g., a smart mirror and an exercise IoT device) included in the body care product group 260 and one second IoT device (e.g., an air conditioner) included in the air care product group 210. The service server 130 may transmit, to the first electronic device 110, the fifth linking function instruction information. The first electronic device 110 may parallelly and/or sequentially operate the multiple first IoT devices (e.g., a smart mirror and an exercise IoT device) included in the body care product group 260 and the one second IoT device (e.g., an air conditioner) included in the air care product group 210 by using the fifth linking function instruction information. Through this operation, after body care using the IoT devices of the body care product group 260, indoor temperature may be managed using the second IoT device included in the air care product group 210.

Referring to FIG. 7B and FIG. 8 again, in operation S250, the first electronic device 110 may receive one or multiple pieces of linking function instruction information from the service server 130, and then provide a function of modifying (or editing) instruction information so as to allow the user to modify (or edit) the one or multiple pieces of linking function instruction information. The electronic device 110 may provide a UI for the function of modifying (or editing) instruction information via a display (e.g., the display device 1060 in FIG. 1 or the display device 60 in FIG. 2). The user may change an instruction configuration value by using the function of modifying (or editing) instruction information and then use the changed instruction configuration value, or may use an instruction configuration value without change. Thereafter, the first electronic device 110 may determine whether the instruction configuration value has been changed.

When a result of the determination in operation S250 indicates that the instruction configuration value has been changed, the first electronic device 110 may generate a detailed configuration value and a comment of the edited instruction (operation S260). The detailed configuration value of the edited instruction may include operation modes (e.g., a cooling mode, an air blowing mode, and a drying mode of an air conditioner) and a total operation time of the IoT device. In addition, the detailed configuration value of the edited instruction may include an operation order of several operation modes of the IoT device and an operation time for each operation mode when the operation modes are sequentially operated.

In operation S270, the first electronic device 110 may transmit linking function instruction information including the detailed configuration value and the comment of the changed instruction to one IoT device (e.g., the first IoT device 120 in FIG. 3) or multiple IoT devices (e.g., the multiple IoT devices 120, 120-1, . . . , and 120-M in FIG. 3). When a result of the determination in operation S250 indicates that the instruction configuration value has not been changed, the first electronic device 110 may transmit linking function instruction information including a detailed configuration value and a comment of an original instruction to one IoT device (e.g., the first IoT device 120 in FIG. 3) or multiple IoT devices (e.g., the multiple IoT devices 120, 120-1, . . . , and 120-M in FIG. 3).

In operation S280, the first electronic device 110 may transmit linking function instruction information to one IoT device or multiple IoT devices so as to remotely execute a function of the corresponding IoT device. The one IoT device or the multiple IoT devices may parallelly and/or sequentially execute a linking function, based on the linking function instruction information received from the first electronic device 110. The first electronic device 110 may monitor execution of a function by the first IoT device 120.

In operation S290, when the execution of the function is terminated, the one IoT device or the multiple IoT devices may transmit information on the termination of the function execution to the first electronic device 110. The first electronic device 110 may identify the termination of function execution by the one IoT device or the multiple IoT devices, based on the received information on the termination of the function execution.

In operation S300, the first electronic device 110 may transmit linking function instruction information including the used (or executed) instruction to the service server 130. The service server 130 may update the used (or executed) instruction received from the first electronic device 110.

Figure 11:
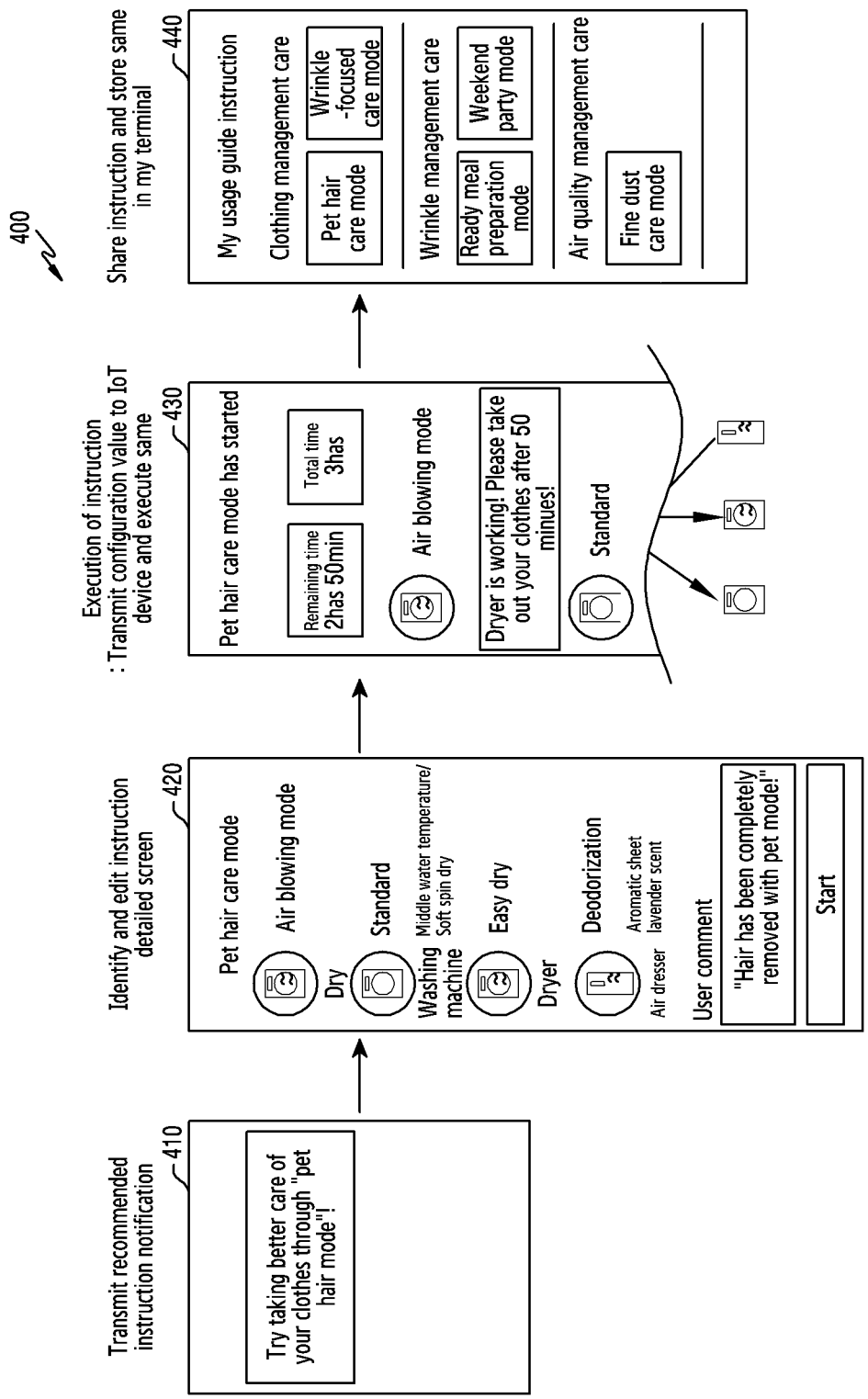
FIG. 11 illustrates an example execution of a method, according to various embodiments, in which an electronic device provides an instruction, and operates IoT devices by using the instruction.

FIG. 11 illustrates an example execution of a a method 400 according to various embodiments, in which an electronic device provides an instruction, and operates IoT devices by using the instruction.

Referring to FIG. 3 and FIG. 11, the service server 130 may transmit, to the first electronic device 110, an instruction notification including linking function instruction information. The first electronic device 110 may display an instruction notification 410 including linking function instruction information, received from the service server 130, via a display device (e.g., the display device 1060 in FIG. 1 or the display device 60 in FIG. 2).

As an embodiment, the first electronic device 110 may provide a user with the instruction notification 410 including linking function instruction information enabling operation of one or multiple IoT devices (e.g., a clothing purifier and an air purifier) located in a particular space (e.g., home) together with the first electronic device 110. The first electronic device 110 may provide a detailed screen of the instruction information and a modification (or edit) function 420 so as to allow the user to modify (or edit) an instruction. The electronic device 110 may provide a detailed screen including a pet hair care mode (air blowing mode, standard, easy dry, and deodorization) and a user comment. In addition, the electronic device 110 may provide a function of modifying (or editing) a detailed function of the pet hair care mode (air blowing mode, standard, easy dry, and deodorization). When a start of a function of one or multiple IoT devices is selected by the user, the first electronic device 110 may transmit an instruction to the one or multiple IoT devices. The one or multiple IoT devices may be operated by the instruction from the first electronic device 110. The first electronic device 110 may provide a detailed screen of an operation of the one or multiple IoT devices according to the executed instruction. In addition, when the operation of the one or multiple IoT devices is terminated, a function 440 of storing the executed instruction may be provided. The first electronic device 110 may store the executed instruction.

Figure 12:
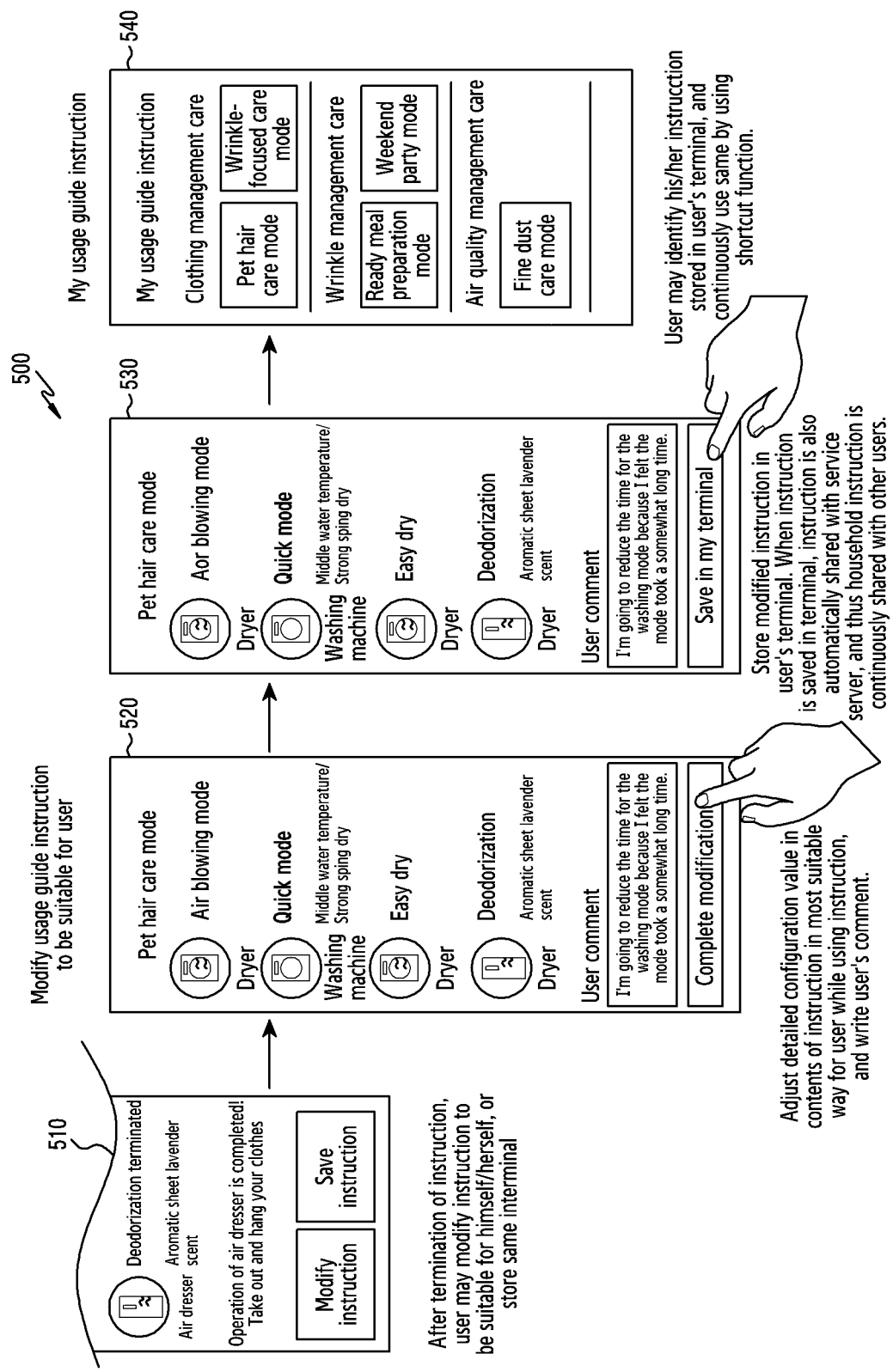
FIG. 12 illustrates an example execution of a method, according to various embodiments, for modifying an instruction of a different user to be suitable for an own IoT device, and storing the modified instruction in an electronic device.

FIG. 12 illustrates an example execution of a method 500, according to various embodiments, for modifying an instruction of a different user to be suitable for an own IoT device, and storing the modified instruction in an electronic device.

Referring to FIG. 3 and FIG. 12, the service server 130 may monitor execution of an operation by the first IoT device 120 (e.g., an air dresser). When the execution of the operation by the first IoT device 120 is terminated, the service server 130 may transmit the termination of the operation execution by the first IoT device 120 to the first electronic device 110. The first electronic device 110 may provide information 510 on the termination of the operation execution by the first IoT device 120 via a display (e.g., the display device 1060 in FIG. 1). The first electronic device 110 may provide a function 520 enabling modification and storage of an instruction for which operation execution of the first IoT device 120 has been used.

When the instruction has not been modified, the first electronic device 110 may store the used instruction. In addition, when the instruction has been modified, the first electronic device 110 may store the modified instruction. The first electronic device 110 may provide a function 520 of modifying the instruction so as to allow the user to adjust a detailed configuration value to be suitable for the user while using the instruction, and to write a comment for the instruction used by the user. The detailed configuration value of the instruction may include operation modes (e.g., a cooling mode, an air blowing mode, and a drying mode of an air conditioner) and a total operation time of the IoT device. In addition, the detailed configuration value of the instruction may include an operation order of several operation modes of the IoT device and an operation time for each operation mode when the operation modes are sequentially operated.

When modification of the user instruction is completed, the first electronic device 110 may store the modified instruction. The first electronic device 110 may perform transmission 530 of the executed instruction to the service server 130. Through this process, the instruction executed and modified by the first electronic device 110 may be updated. In addition, the instruction executed and modified by the first electronic device 110 may be transmitted to and shared with a different electronic device. The first electronic device 110 may provide a history 540 of previously used instructions via a display device. The first electronic device 110 may configure a shortcut function for each of the previously used instructions. The electronic device 110 may provide convenience so that the user easily identifies a previously used instruction, and continuously use the instruction.

Figure 13:
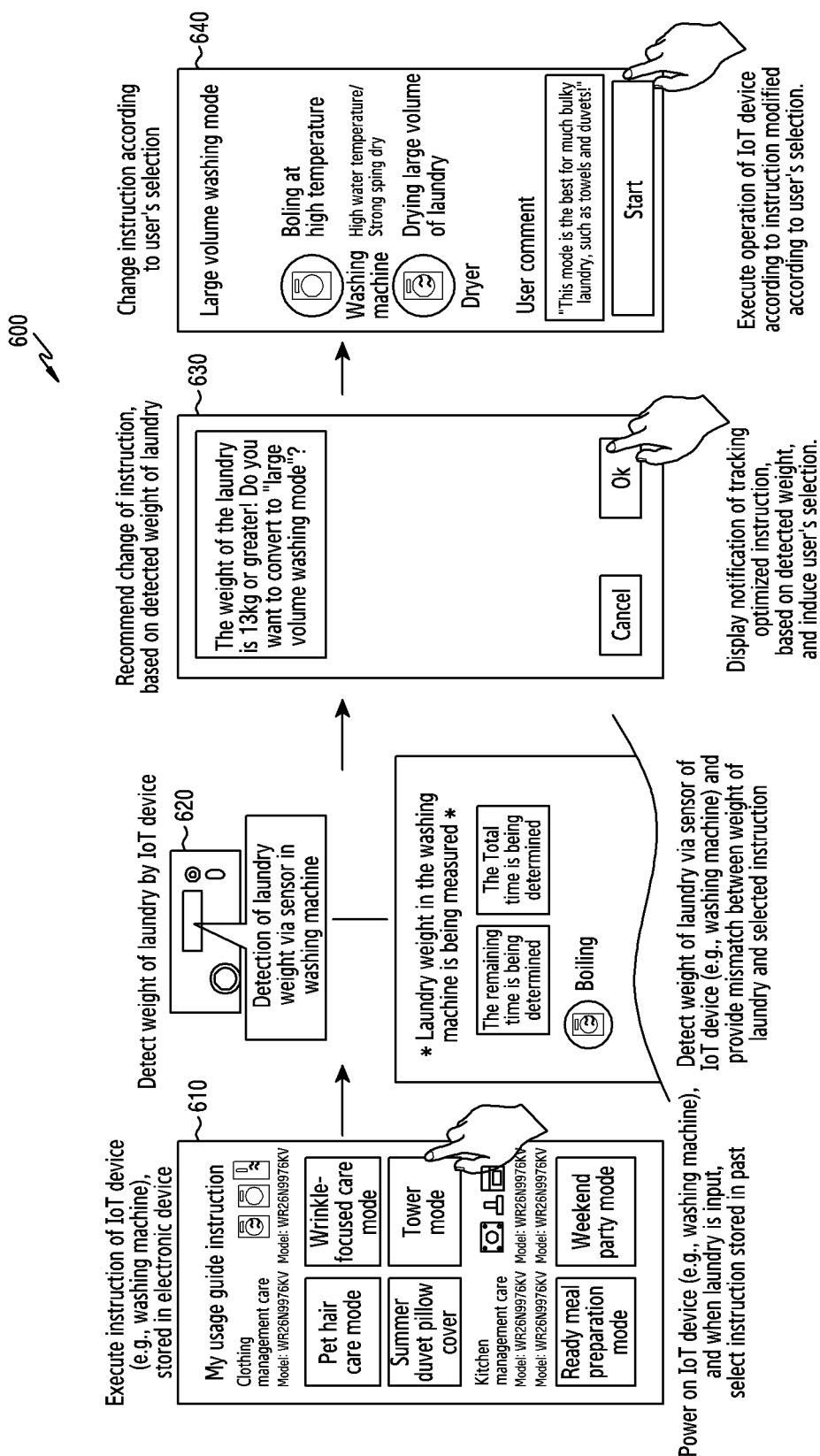
FIG. 13 illustrates an example execution of a method, according to various embodiments, for modifying an instruction, based on laundry weight detection of an IoT device (e.g., washing machine), and applying the modified instruction.

FIG. 13 illustrates an example execution of a method 600, according to various embodiments, for modifying an instruction, based on laundry weight detection of an IoT device (e.g., washing machine), and applying the modified instruction.

Referring to FIG. 3 and FIG. 13, in operation 610, when a change of an operation state (e.g., power on, power off, or a standby mode) of a first IoT device (e.g., washing machine) is detected, the first electronic device 110 may execute an instruction of the first IoT device (e.g., washing machine), which is stored in a memory. The first electronic device 110 may provide, via a user interface, an operation mode (e.g., a pet hair care mode, a wrinkle-focused care mode, a summer duvet pillow cover care mode, and a towel mode) and usage guide information the instruction of a first IoT device (e.g., washing machine). The first electronic device 110 may also provide an operation mode and usage guide information of the second IoT device 120-1 (e.g., oven) operable in connection with the first IoT device (e.g., washing machine).

In operation 620, the first IoT device 120 may detect the weight of laundry via a sensor, and provide information on the weight of the laundry to the first electronic device 110. The first electronic device 110 may determine whether the selected instruction is matched to the weight of the laundry, based on the information on the weight of the laundry, received from the first IoT device 120. When the selected instruction is not matched to the weight of the laundry, the first electronic device 110 may provide, through a notification, the mismatch between the weight of the laundry and the selected instruction.

In operation 630, the first electronic device 110 may recommend a change of the instruction, based on the detected weight of the laundry. The first electronic device 110 may recommend an instruction optimized for the weight of the laundry. The recommended instruction may be selected from among instructions stored in the memory of the first electronic device 110, and may be provided from the service server 130. The first electronic device 110 may induce a user's selection by recommending an instruction.

In operation 640, the first electronic device 110 may change the instruction to be matched to the weight of the laundry according to the user's selection. In operation S180, the first electronic device 110 may transmit the instruction modified by the user's selection to the first IoT device 120 so as to execute an operation of the first IoT device 120.

Figure 14:
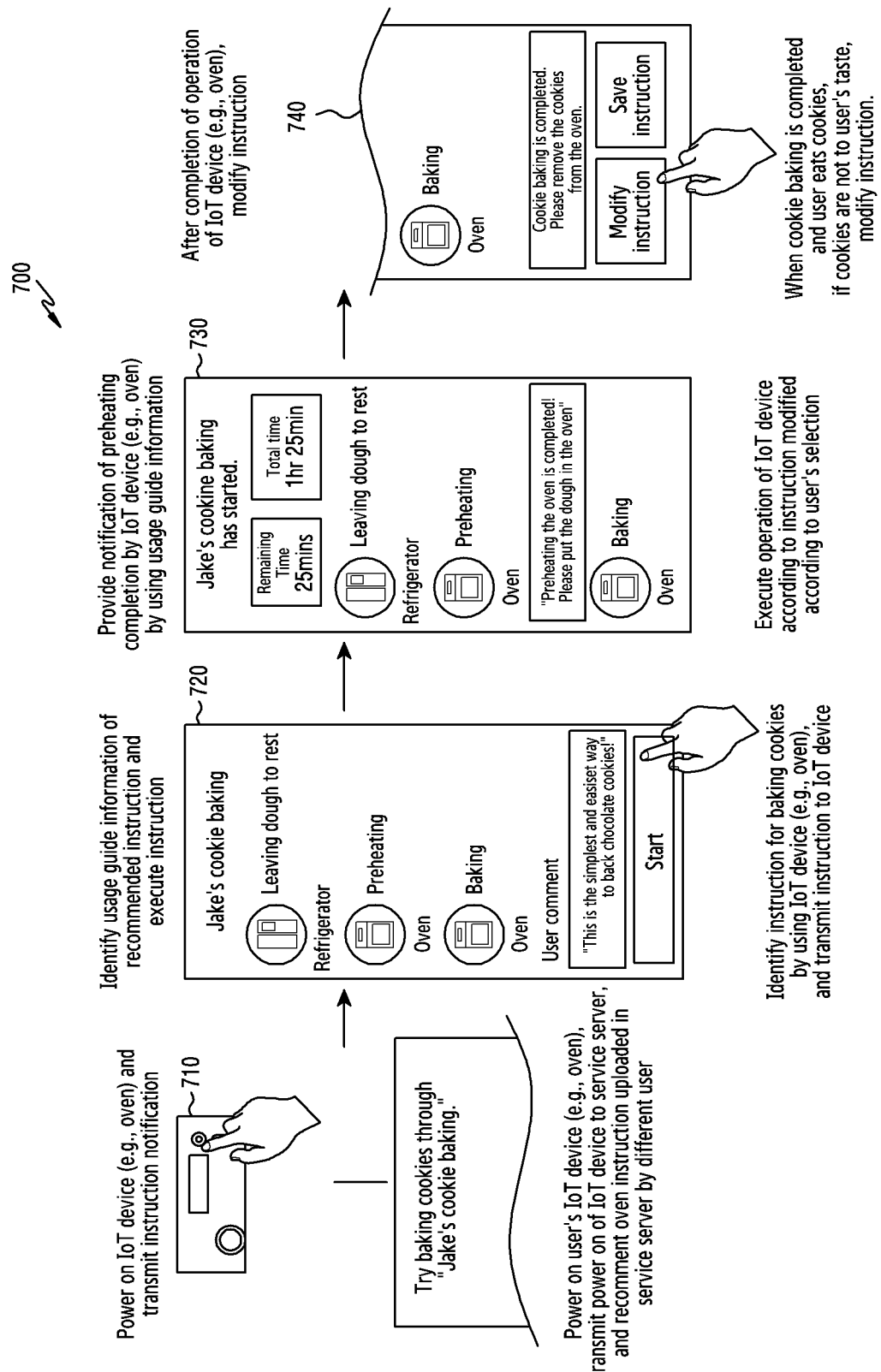
FIG. 14 illustrates an example execution of a method, according to various embodiments, for modifying an instruction after execution of an operation by an IoT device (e.g., oven)

FIG. 14 illustrates an example execution of a method 700, according to various embodiments, for modifying an instruction after execution of an operation by an IoT device (e.g., oven).

Referring to FIG. 14, in operation 710, when a change of an operation state (e.g., power on, power off, or a standby mode) of a first IoT device (e.g., oven) is detected, the service server 130 may transmit an instruction for execution of an operation of the first IoT device 120 to the first electronic device 110. The service server 130 may transmit an instruction of the first IoT device 120 (oven), which is uploaded by a different user, to the first electronic device 110 so as to recommend the instruction to a user.

In operation 720, the first IoT device 120 may display usage guide information of the instruction received from the service server 130 so as to allow the user to identify same. The first electronic device 110 may execute a first instruction according to the user's selection so as to execute an operation of the first IoT device. As an embodiment, the user may identify an instruction for baking cookies using an oven, and transmit the instruction to the first IoT device 120.

In operation 730, the first electronic device 110 may provide a preheating completion notification of the first IoT device 120 (e.g., oven) by using usage guide information of the instruction. A process in which dough is required to be put in after preheating is applied to an oven, and thus the first electronic device 110 may provide, through a notification, the usage guide information reflecting the process of the oven.

In operation 740, the first electronic device 110 may provide a function of modifying the instruction after execution of the operation by the first IoT device 120 (e.g., oven) is completed. As an embodiment, after the user eats the cookies cooked using the oven, if the cookies are determined not to be the user's taste, modification of the instruction may be required. After execution of the operation by the first IoT device 120 is completed, the first electronic device 110 may provide a function of modifying the instruction, so that the instruction is modified to meet the user's taste.

Figure 15:
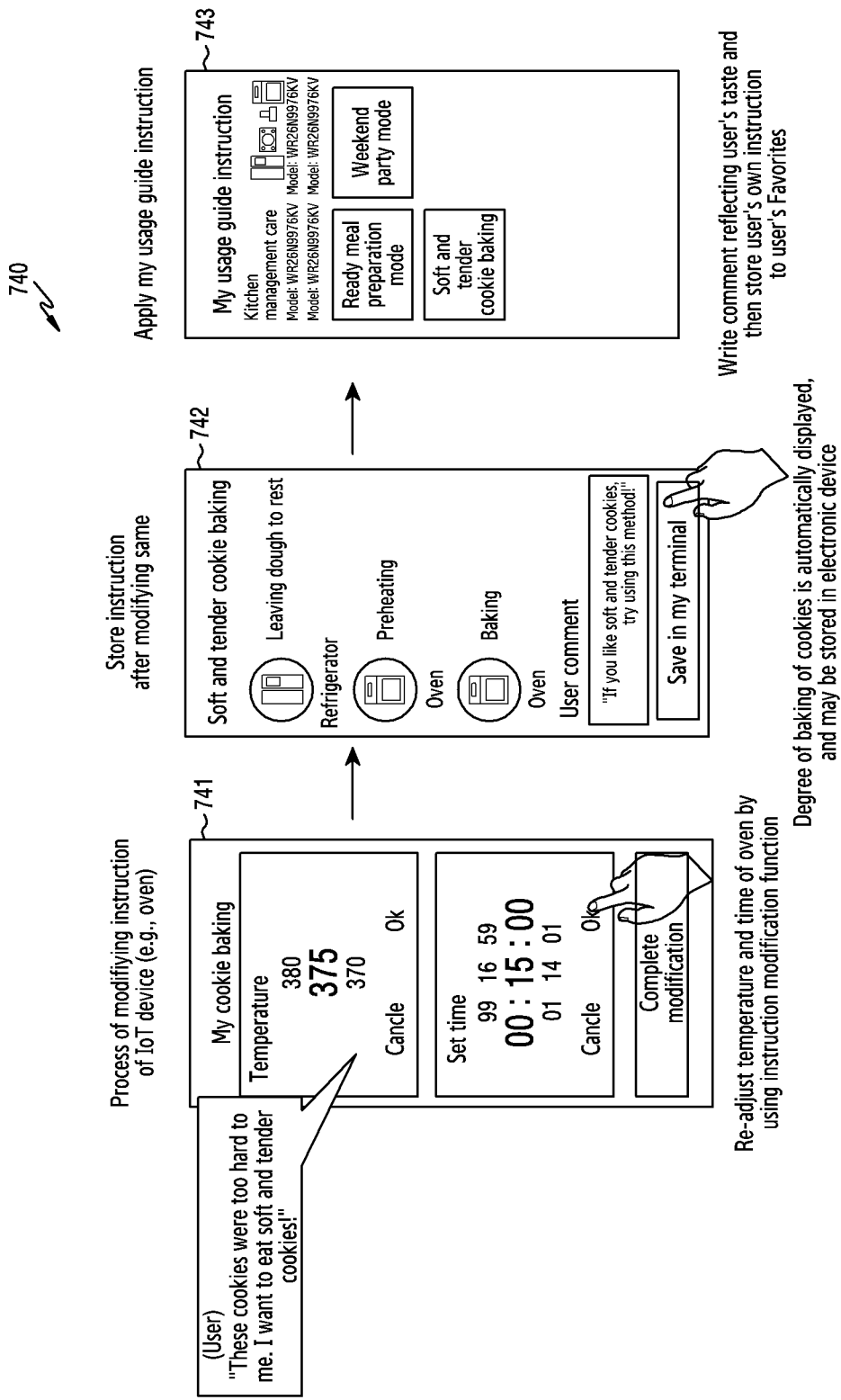
FIG. 15 illustrates an example execution of a method, according to various embodiments, for modifying an instruction to meet a user's taste.

FIG. 15 illustrates an example execution of a method 740, according to various embodiments, for modifying an instruction to meet a user's taste.

Referring to FIG. 15, in operation 741, the first electronic device 110 may provide a function of modifying an instruction, so that a detailed configuration value (e.g., a preheating temperature, a baking temperature, and a baking time) of a cookie baking mode of the instruction is modified.

In operation 742, after the modification of the instruction is completed, the first electronic device 110 may display usage guide information of the modified instruction. The first electronic device 110 may store the modified instruction in a memory.

In operation 743, the first electronic device 110 may provide, for the modified instruction, a function of writing a comment reflecting a user's taste. The first electronic device 110 may apply the modified instruction and a user comment to the user's Favorites and store same in the memory. The user may modify the instruction and write a comment reflecting the user's taste, and save the modified instruction and the comment to the user's Favorites. The user may easily select the instruction through a Favorites function to operate an operation of an IoT device in the future. The first electronic device 110 may classify executed instructions by users, and store and manage instructions by users, enabling their selection at a later time. Instructions classified and managed according to users may be easily selected to execute an operation of an IoT device.

Various embodiments of the disclosure may provide a method for sharing an instruction to control a function of IoT devices, the instruction enabling control of multiple IoT devices located in a home or a particular pace in conjunction with each other, and an electronic device capable of performing the same method.

Various embodiments of the disclosure may provide a method for sharing an instruction to control a function of an IoT device between different users holding identical or similar IoT devices, and an electronic device capable of performing the same method.

The electronic device 110 according to various embodiments may include a communication module 1090, a processor 1020 operatively connected to the communication module 1090, and a memory 1030 operatively connected to the processor 1020. The memory 1030 may cause, when executed, the processor 1020 to, when execution of an operation by the first IoT device 120 is detected, obtain a first instruction to operate the first IoT device 120 from the memory 1030, transmit the first instruction to the first IoT device 120 to operate the first IoT device 120, and monitor execution of an operation by the first IoT device 120.

The processor 1020 of the electronic device 110 may be configured to identify the second IoT device 120-1 simultaneously or sequentially operable with the first IoT device 120 through the first instruction, and transmit the first instruction to the second IoT device 120-1 to sequentially operate the second IoT device 120-1 after the operating of the first IoT device, or simultaneously operate the first IoT device 120 or the second IoT device 120-1.

The processor 1020 of the electronic device 110 may be configured to obtain detection information from the first IoT device 120, and when the execution of the operation by the first IoT device 120 according to the first instruction is not suitable based on the detection information, modify the first instruction, based on the detection information, and transmit the modified first instruction to the first IoT device 120 to operate the first IoT device 120.

The processor 1020 of the electronic device 110 may be configured to identify a request to modify the first instruction from a user, modify the first instruction, based on the request to modify the first instruction, and operate the first IoT device 120 according to the modified first instruction.

The processor 1020 of the electronic device 110 may be configured to modify, based on selection of the user, at least one of operation modes of the first IoT device 120, a total operation time, an operation order of the operation modes, and an operation time for each operation mode, which are included in the first instruction.

The processor 1020 of the electronic device 110 may be configured to store the modified first instruction in the memory 1030, and transmit the modified first instruction to the service server 130 connected via the communication network 101.

The processor 1020 of the electronic device 110 may be configured to, after execution of the operating of the first IoT device 120 according to the first instruction is terminated, modify the first instruction, based on a user's request, and store the modified first instruction in the memory 1030 and transmit the modified first instruction to the service server 130 connected via the communication network 101.

The processor 1020 of the electronic device 110 may be configured to classify executed instructions by users, and manage the instructions so as to allow selection of an instruction used by each of the users.

The processor 1020 of the electronic device 110 may be configured to generate a first instruction so as to allow multiple IoT devices to be grouped and operated in connection with each other, and transmit the first instruction to the multiple IoT devices to sequentially or simultaneously operate the multiple IoT devices.

The processor 1020 of the electronic device 110 may be configured to register the electronic device 110 in the service server 130 connected via the communication network 101, by using an identification (ID), connect to the first IoT device 120 via the service server 130, and transmit the first instruction to the first IoT device 120 via the service server 130 so as to operate the first IoT device 120.

The processor 1020 of the electronic device 110 may be configured to monitor execution of an operation by the first IoT device 120 via the service server 130.

The processor 1020 of the electronic device 110 may be configured to, when execution of an operation by the second IoT device 120-1 is detected, receive a second instruction to operate the second IoT device 120-1 from the service server 130 connected via a communication network 101, and transmit the second instruction to the second IoT device 120-1 to operate the second IoT device 120-1.

The processor 1020 of the electronic device 110 may be configured to monitor execution of an operation by the second IoT device 120-1 via the service server 130.

The processor 1020 of the electronic device 110 may be configured to identify a request to modify the second instruction from a user, modify, based on the request to modify the second instruction, at least one of operation modes of the first IoT device 120, a total operation time, an operation order of the operation modes, and an operation time for each operation mode, which are included in the second instruction, transmit the modified second instruction to the second IoT device 120-1 to operate the second IoT device 120, and monitor execution of an operation by the second IoT device 120 via the service server.

The processor 1020 of the electronic device 110 may be configured to store the modified second instruction in the memory 1030, and transmit the modified second instruction to the service server 130.

A method for sharing an instruction between IoT devices according to various embodiments of the disclosure may include detecting, by the electronic device 110, execution of an operation by the first IoT device 120, when the execution of the operation by the first IoT device 120 is detected, obtaining a first instruction to operate the first IoT device 120 from the memory 1030 of the electronic device 110, and transmitting the first instruction to the first IoT device 120 device to operate the first IoT device 120.

The method for sharing an instruction between IoT devices may include modifying, based on a user's selection, at least one of operation modes of the first IoT device 120, a total operation time, an operation order of the operation modes, and an operation time for each operation mode, which are included in the first instruction, transmitting the modified first instruction to the first IoT device 120, and operating the first IoT device 120 according to the modified first instruction.

The method for sharing an instruction between IoT devices may include storing the modified first instruction in the memory 1030 of the electronic device 110, and transmitting same to the service server 130.

The method for sharing an instruction between IoT devices may include obtaining detection information from the first IoT device 120, and when the execution of the operation by the first IoT device 120 according to the first instruction is not suitable based on the detection information, modifying the first instruction, based on the detection information, transmitting the modified first instruction to the first IoT device 120 to operate the first IoT device 120, and monitoring the operating of the first IoT device 120.

The method for sharing an instruction between IoT devices may include, after execution of the operating of the first IoT device 120 according to the first instruction is terminated, modifying the first instruction, based on a user's request, storing the modified first instruction in the memory 1030, and transmitting the modified first instruction to the service server 130 connected via the communication network 101.

The method for sharing an instruction between IoT devices may include, when execution of an operation by the first IoT device 120 is detected, receiving a second instruction to operate the first IoT device 120 from the service server 130 connected via a communication network 101, transmitting the second instruction to the first IoT device 120 to operate the first IoT device 120, and monitoring the operating of the first IoT device 120.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage or recording medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   communication circuitry;
   a processor operatively connected to the communication circuitry; and
   memory for storing computer program code,
   wherein, when executed by the processor, the computer program code causes the electronic device to:
      based on detecting execution of a first operation by a first Internet of Things (IoT) device:
         obtain, from the memory, a first instruction to operate the first IoT device,
         identify whether there is a request from a user to modify the first instruction,
         if there is no request from the user to modify the first instruction, transmit the first instruction to the first IoT device to operate the first IoT device,
         if there is the request from the user to modify the first instruction:
            modify the first instruction based on the request, and
            transmit the modified first instruction to the first IoT device to operate the first IoT device, and
      monitor execution of a second operation, wherein the second operation is executed by the first IoT device in response to the first instruction or the modified first instruction, wherein the computer program code further causes the
electronic device to:
modify, based on a selection of the user, at least one
configuration element included in the first instruction, the at least one configuration element being one
of: operation modes of the first IoT device, a total
operation time, an operation order of the operation
modes, and an operation time for each operation
mode, and
transmit, to a server, the first instruction or the modified
first instruction for sharing with at least one user
having a IoT device corresponding to the first IoT
device.

2. The electronic device of claim 1, wherein the computer program code further causes the electronic device to:
identify a second IoT device operable in connection with
the first IoT device through the first instruction, and
transmit the first instruction to the second IoT device to
thereby sequentially operate the second IoT device
after the operating of the first IoT device.

3. The electronic device of claim 1, wherein the computer program code further causes the electronic device to:
identify a second IoT device operable in connection with
the first IoT device through the first instruction, and
transmit the first instruction to the second IoT device to
thereby simultaneously operate the first IoT device and
the second IoT device.

4. The electronic device of claim 1, wherein the computer program code further causes the electronic device to:
obtain detection information from the first IoT device, and
based on the execution of the second operation by the first
IoT device according to the first instruction not being
suitable based on the detection information:
modify the first instruction, based on the detection information, and
transmit the modified first instruction to the first IoT
device to operate the first IoT device in the second
operation.

5. The electronic device of claim 1, wherein the computer program code further causes the electronic device to:
store the modified first instruction in the memory, and
transmit the modified first instruction to a service server
connected via a communication network.

6. The electronic device of claim 1, wherein the computer program code further causes the electronic device, after the execution of the second operation of the first IoT device according to the first instruction is terminated, to:
modify the first instruction based on a request from a user, and
transmit the modified first instruction to a service server
connected via a communication network.

7. The electronic device of claim 1, wherein the computer program code further causes the electronic device to:
classify instructions executed by users, and
manage the classified instructions so as to enable selection
of each classified instruction for execution.

8. The electronic device of claim 1, wherein the computer program code further causes the electronic device, based on the first instruction grouping a plurality of IoT devices for operation in connection with each other, to transmit the first instruction to each of the plurality of IoT devices to thereby sequentially or simultaneously operate the plurality of IoT devices.

9. The electronic device of claim 1, wherein the computer program code further causes the electronic device to:
register the electronic device in a service server connected
via a communication network, by using an identification (ID),
connect to the first IoT device via the service server,
transmit the first instruction to the first IoT device via the
service server so as to operate the first IoT device, and
monitor the execution of the first operation via the service
server.

10. The electronic device of claim 1, wherein the computer program code further causes the electronic device, based on detecting execution of a third operation by a second IoT device, to:
receive a second instruction, from a service server connected via a communication network, to operate the
second IoT device in a fourth operation, and
transmit the second instruction to the second IoT device
to operate the second IoT device in the fourth operation.

11. The electronic device of claim 10, wherein the computer program code further causes the electronic device to monitor execution of the fourth operation by the second IoT device responsive to the second instruction, via the service server.

12. The electronic device of claim 10, wherein the computer program code further causes the electronic device to:
identify a request from a user to modify the second
instruction,
modify, based on the request, at least one configuration
element included in the second instruction, the at least
one configuration element being one of: operation
modes of the second IoT device, a total operation time,
an operation order of the operation modes, and an
operation time for each operation mode, and
transmit the modified second instruction to the second IoT
device to operate the second IoT device.

13. The electronic device of claim 11, wherein the computer program code further causes the electronic device to transmit the modified second instruction to the service server.

14. The electronic device of claim 1, wherein the first operation includes a change in operation state performed by the first IoT device.

15. A method for sharing an instruction between IoT devices, the method comprising:
detecting, by an electronic device, execution of a first
operation by a first Internet of Things (IoT) device;
based on detecting the execution of the first operation by
the first IoT device:
obtaining, from a memory of the electronic device, a
first instruction to operate the first IoT device;
identifying whether there is a request from a user to
modify the first instruction;
if there is no request from the user to modify the first
instruction, transmitting the first instruction to the
first IoT device to operate the first IoT device;
if there is the request from the user to modify the first
instruction:
modifying the first instruction based on the request,
and
transmitting the modified first instruction to the first
IoT device to operate the first IoT device; and
monitoring execution of a second operation, wherein
the second operation is executed by the first IoT
device in response to the first instruction or the
modified first instruction,
wherein the first instruction or the modified first instruction comprises at least one configuration element, wherein the at least one configuration element being one of: operation modes of the first IoT device, a total operation time, an operation order of the operation modes, and an operation time for each operation mode, transmitting, to a server, the first instruction or the modified first instruction for sharing with at least one user having a IoT device corresponding to the first IoT device.

16. A non-transitory computer-readable recording medium having recorded thereon instructions executable by at least one processor to perform a method for sharing an instruction between IoT devices, the method comprising:

detecting, by an electronic device, execution of a first operation by a first Internet of Things (IoT) device;

based on detecting the execution of the first operation by the first IoT device:

obtaining, from a memory of the electronic device, a first instruction to operate the first IoT device in a second operation;

identifying whether there is a request from a user to modify the first instruction;

if there is no request from the user to modify the first instruction, transmitting the first instruction to the first IoT device to operate the first IoT device;

if there is the request from the user to modify the first instruction:

modifying the first instruction based on the request, and transmitting the modified first instruction to the first IoT device to operate the first IoT device; and monitoring execution of a second operation, wherein the second operation is executed by the first IoT device in response to the first instruction or the modified first instruction, wherein the first instruction or the modified first instruction comprises at least one configuration element, wherein the at least one configuration element being one of: operation modes of the first IoT device, a total operation time, an operation order of the operation modes, and an operation time for each operation mode, transmitting, to a server, the first instruction or the modified first instruction for sharing with at least one user having a IoT device corresponding to the first IoT device.

17. The method of claim 15, wherein the first operation includes a change in operation state performed by the first IoT device.

18. The non-transitory computer-readable recording medium of claim 16, wherein the first operation includes a change in operation state performed by the first IoT device.

* * * * *